(12) United States Patent
Vasudevan et al.

(10) Patent No.: US 9,325,752 B2
(45) Date of Patent: Apr. 26, 2016

(54) PRIVATE INTERACTION HUBS

(71) Applicant: Microsoft Technology Licensing, LLC, Redmond, WA (US)

(72) Inventors: Lavanya Vasudevan, Sammamish, WA (US); Shawn M. Thomas, Redmond, WA (US); Joseph H. Matthews, III, Woodinville, WA (US); Joseph A. Schrader, Kirkland, WA (US); Ted Tai-Yu Chen, Seattle, WA (US); Raman K. Sarin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 13/726,092

(22) Filed: Dec. 22, 2012

(65) Prior Publication Data

US 2013/0227431 A1 Aug. 29, 2013

Related U.S. Application Data

(60) Provisional application No. 61/580,143, filed on Dec. 23, 2011.

(51) Int. Cl.
*H04L 29/06* (2006.01)
*G06Q 10/10* (2012.01)
(Continued)

(52) U.S. Cl.
CPC ............ *H04L 65/403* (2013.01); *G06F 9/4443* (2013.01); *G06Q 10/107* (2013.01); *G06Q 50/01* (2013.01); *H04L 29/06* (2013.01)

(58) Field of Classification Search
CPC .......... G06F 17/3089; G06F 17/30873; H04L 29/06

USPC ........................................................ 715/742
See application file for complete search history.

(56) References Cited

U.S. PATENT DOCUMENTS 5,883,598 A 3/1999 Parl et al.
6,286,001 B1 9/2001 Walker et al.
(Continued)

FOREIGN PATENT DOCUMENTS

CN 1984402 6/2007
CN 101112072 1/2008
(Continued)

OTHER PUBLICATIONS

"BroadCloud FamilyCenter", *BroadSoft Data Sheet*, retrieved from <http://www.broadsoft.com/pdf/datasheet-broadcloud-familycenter.pdf> on Dec. 13, 2011, 1 page.
(Continued)

*Primary Examiner* — Andrea Leggett
(74) *Attorney, Agent, or Firm* — Judy Yee; Micky Minhas; Lee & Hayes, PLLC

(57) ABSTRACT

In embodiments of private interaction hubs, a mobile device has memory storage to maintain hub data that is associated with a private interaction hub, where the hub data includes multiple types of displayable data that is editable by different types of device applications. The memory storage at the device also maintains private data that is displayable and is viewable with one of the device applications. The mobile device also includes a display device to display the multiple types of the hub data in a hub user interface of a hub application. The display device can also display the private data and a subset of the hub data that are both associated with a device application in a device application user interface.

20 Claims, 9 Drawing Sheets

(51) Int. Cl.
*G06Q 50/00* (2012.01)
*G06F 9/44* (2006.01)

(56) References Cited

U.S. PATENT DOCUMENTS

| | | |
|---|---|---|
| 6,339,826 B2 | 1/2002 | Hayes et al. |
| 6,405,033 B1 | 6/2002 | Kennedy et al. |
| 6,446,069 B1 | 9/2002 | Yaung et al. |
| 6,504,480 B1 | 1/2003 | Magnuson et al. |
| 6,519,530 B2 | 2/2003 | Crockett et al. |
| 6,546,002 B1 | 4/2003 | Kim |
| 6,549,768 B1 | 4/2003 | Fraccaroli |
| 6,564,149 B2 | 5/2003 | Lai |
| 6,650,189 B1 | 11/2003 | Romao |
| 6,662,023 B1 | 12/2003 | Helle |
| 6,678,508 B1 | 1/2004 | Koilpillai et al. |
| 6,799,047 B1 | 9/2004 | Bahl et al. |
| 6,847,892 B2 | 1/2005 | Zhou |
| 6,920,455 B1 | 7/2005 | Weschler |
| 6,941,134 B2 | 9/2005 | White |
| 7,058,659 B2 | 6/2006 | Ryu |
| 7,076,797 B2 | 7/2006 | Loveland |
| 7,096,030 B2 | 8/2006 | Huomo |
| 7,142,848 B2 | 11/2006 | Owen et al. |
| 7,161,914 B2 | 1/2007 | Shoaib et al. |
| 7,171,557 B2 | 1/2007 | Kallahalla et al. |
| 7,212,613 B2 | 5/2007 | Kim et al. |
| 7,222,360 B1 | 5/2007 | Miller |
| 7,272,388 B2 | 9/2007 | Andrew et al. |
| 7,274,925 B2 | 9/2007 | Chaar et al. |
| 7,302,272 B2 | 11/2007 | Ackley |
| 7,305,284 B2 | 12/2007 | Teshima et al. |
| 7,308,255 B2 | 12/2007 | Loveland |
| 7,321,774 B1 | 1/2008 | Lau et al. |
| 7,346,921 B2 | 3/2008 | Murren et al. |
| 7,359,713 B1 | 4/2008 | Tiwari |
| 7,366,798 B2 | 4/2008 | Nordstrom et al. |
| 7,408,506 B2 | 8/2008 | Miller |
| 7,471,929 B2 | 12/2008 | Fujioka et al. |
| 7,530,099 B2 | 5/2009 | Flurry et al. |
| 7,634,455 B1 | 12/2009 | Keene et al. |
| 7,657,849 B2 | 2/2010 | Chaudhri et al. |
| 7,668,830 B2 | 2/2010 | Hakala |
| 7,680,882 B2 | 3/2010 | Tiu, Jr. et al. |
| 7,714,778 B2 | 5/2010 | Dupray |
| 7,796,944 B2 | 9/2010 | Eaton et al. |
| 7,809,350 B2 | 10/2010 | Buckley et al. |
| 7,869,792 B1 | 1/2011 | Zhou et al. |
| 7,898,428 B2 | 3/2011 | Dietz et al. |
| 7,958,562 B2 | 6/2011 | Gaucas |
| 7,961,651 B2 | 6/2011 | Kim et al. |
| 8,046,839 B2 | 10/2011 | Lo |
| 8,244,272 B2 | 8/2012 | Morgan et al. |
| 8,275,352 B2 | 9/2012 | Forstall et al. |
| 8,311,730 B2 | 11/2012 | Neff |
| 8,355,751 B2 | 1/2013 | Dietz et al. |
| 8,385,039 B2 | 2/2013 | Rothkopf |
| 8,437,779 B2 | 5/2013 | Phukan |
| 8,549,657 B2 | 10/2013 | Karlson et al. |
| 8,565,820 B2 | 10/2013 | Riemer et al. |
| 8,657,743 B2 | 2/2014 | Rietzel et al. |
| 8,706,172 B2 | 4/2014 | Priyantha et al. |
| 8,874,162 B2 | 10/2014 | Schrader et al. |
| 8,907,772 B1 | 12/2014 | Green et al. |
| 8,918,119 B2 | 12/2014 | Kim et al. |
| 9,027,117 B2 | 5/2015 | Wilairat et al. |
| 9,066,234 B2 | 6/2015 | Karlson et al. |
| 2001/0005681 A1 | 6/2001 | Kim |
| 2001/0039587 A1 | 11/2001 | Uhler et al. |
| 2002/0026478 A1 | 2/2002 | Rodgers et al. |
| 2002/0044149 A1 | 4/2002 | McCarthy et al. |
| 2003/0003907 A1 | 1/2003 | Lai et al. |
| 2003/0139192 A1 | 7/2003 | Chmaytelli et al. |
| 2003/0187803 A1 | 10/2003 | Pitt |
| 2004/0007916 A1 | 1/2004 | Awada et al. |
| 2004/0015940 A1 | 1/2004 | Heisey et al. |
| 2004/0039909 A1 | 2/2004 | Cheng |
| 2004/0166878 A1 | 8/2004 | Erskine et al. |
| 2004/0192352 A1 | 9/2004 | Vallstrom et al. |
| 2004/0203576 A1 | 10/2004 | Droste et al. |
| 2005/0012640 A1 | 1/2005 | Kong et al. |
| 2005/0037775 A1 | 2/2005 | Moeglein et al. |
| 2005/0055567 A1 | 3/2005 | Libin et al. |
| 2005/0070276 A1 | 3/2005 | McGarry |
| 2005/0107114 A1 | 5/2005 | Ocock et al. |
| 2005/0138110 A1 | 6/2005 | Redlich et al. |
| 2005/0143171 A1 | 6/2005 | Loose |
| 2005/0210104 A1 | 9/2005 | Torvinen |
| 2005/0222768 A1 | 10/2005 | Tauchi et al. |
| 2006/0046706 A1 | 3/2006 | Lin et al. |
| 2006/0053389 A1 | 3/2006 | Michelman |
| 2006/0099969 A1 | 5/2006 | Staton et al. |
| 2006/0136998 A1 | 6/2006 | Oowaki et al. |
| 2006/0246872 A1 | 11/2006 | Tarkkala |
| 2006/0253570 A1 | 11/2006 | Biswas et al. |
| 2006/0256005 A1 | 11/2006 | Thandu et al. |
| 2006/0271797 A1 | 11/2006 | Ginggen et al. |
| 2006/0293057 A1 | 12/2006 | Mazerski et al. |
| 2007/0006327 A1 | 1/2007 | Lal et al. |
| 2007/0028176 A1 | 2/2007 | Perdomo et al. |
| 2007/0032225 A1 | 2/2007 | Konicek et al. |
| 2007/0042790 A1 | 2/2007 | Mohi et al. |
| 2007/0046423 A1 | 3/2007 | Baucom |
| 2007/0046456 A1 | 3/2007 | Edwards et al. |
| 2007/0064882 A1 | 3/2007 | Ger et al. |
| 2007/0067655 A1 | 3/2007 | Shuster |
| 2007/0072616 A1 | 3/2007 | Irani |
| 2007/0082707 A1 | 4/2007 | Flynt et al. |
| 2007/0091037 A1 | 4/2007 | Lee |
| 2007/0111726 A1 | 5/2007 | Lambert et al. |
| 2007/0150826 A1 | 6/2007 | Anzures et al. |
| 2007/0150842 A1 | 6/2007 | Chaudhri et al. |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0300140 A1 | 12/2007 | Makela et al. |
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0051079 A1 | 2/2008 | Forsgren |
| 2008/0080688 A1 | 4/2008 | Burgan et al. |
| 2008/0082693 A1 | 4/2008 | Meijer et al. |
| 2008/0101658 A1 | 5/2008 | Ahern et al. |
| 2008/0111698 A1 | 5/2008 | Atherton |
| 2008/0154780 A1 | 6/2008 | Soukup et al. |
| 2008/0184127 A1 | 7/2008 | Rafey et al. |
| 2008/0254767 A1 | 10/2008 | Jin |
| 2008/0268870 A1 | 10/2008 | Houri |
| 2008/0305808 A1 | 12/2008 | Chan et al. |
| 2008/0318595 A1 | 12/2008 | Rofougaran |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0201896 A1 | 8/2009 | Davis et al. |
| 2009/0205041 A1 | 8/2009 | Michalske |
| 2009/0224931 A1 | 9/2009 | Dietz et al. |
| 2009/0265794 A1 | 10/2009 | Apelqvist |
| 2009/0278738 A1 | 11/2009 | Gopinath |
| 2009/0282473 A1 | 11/2009 | Karlson et al. |
| 2010/0001967 A1 | 1/2010 | Yoo |
| 2010/0020035 A1 | 1/2010 | Ryu et al. |
| 2010/0056124 A1 | 3/2010 | Keating et al. |
| 2010/0066821 A1 | 3/2010 | Rosener et al. |
| 2010/0074450 A1 | 3/2010 | Liao |

(56) References Cited

U.S. PATENT DOCUMENTS

| | | |
|---|---|---|
| 2010/0115610 A1 | 5/2010 | Tredoux et al. |
| 2010/0127836 A1 | 5/2010 | Huang et al. |
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0227588 A1 | 9/2010 | Bradley |
| 2010/0253503 A1 | 10/2010 | Juang |
| 2010/0255856 A1 | 10/2010 | Kansal et al. |
| 2010/0268779 A1 | 10/2010 | Rao |
| 2010/0285815 A1 | 11/2010 | Treu et al. |
| 2010/0302028 A1 | 12/2010 | Desai et al. |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0324819 A1 | 12/2010 | Nurminen et al. |
| 2011/0010340 A1 | 1/2011 | Hung et al. |
| 2011/0021213 A1 | 1/2011 | Carr |
| 2011/0021234 A1 | 1/2011 | Tibbitts et al. |
| 2011/0047484 A1 | 2/2011 | Mount et al. |
| 2011/0063098 A1 | 3/2011 | Fischer et al. |
| 2011/0065419 A1 | 3/2011 | Book et al. |
| 2011/0070829 A1 | 3/2011 | Griffin et al. |
| 2011/0093161 A1 | 4/2011 | Zhou et al. |
| 2011/0111728 A1 | 5/2011 | Ferguson et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0299422 A1 | 12/2011 | Kim et al. |
| 2011/0307166 A1 | 12/2011 | Hiestermann et al. |
| 2011/0319051 A1 | 12/2011 | Reitnour |
| 2011/0319094 A1 | 12/2011 | Usui et al. |
| 2012/0023573 A1 | 1/2012 | Shi |
| 2012/0046020 A1 | 2/2012 | Tomasini |
| 2012/0084691 A1 | 4/2012 | Yun |
| 2012/0084734 A1 | 4/2012 | Weerapan |
| 2012/0084737 A1 | 4/2012 | Gimpl et al. |
| 2012/0098768 A1 | 4/2012 | Bendewald et al. |
| 2012/0100895 A1 | 4/2012 | Priyantha et al. |
| 2012/0115512 A1 | 5/2012 | Grainger et al. |
| 2012/0144468 A1 | 6/2012 | Pratt et al. |
| 2012/0146850 A1 | 6/2012 | Liu et al. |
| 2012/0234058 A1 | 9/2012 | Neil et al. |
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0268249 A1 | 10/2012 | Kansal |
| 2012/0282887 A1 | 11/2012 | Khoo et al. |
| 2012/0289217 A1 | 11/2012 | Riemer et al. |
| 2012/0306637 A1 | 12/2012 | McGough et al. |
| 2012/0317162 A1* | 12/2012 | Endsley et al. ............... 709/201 |
| 2013/0006469 A1 | 1/2013 | Green et al. |
| 2013/0023246 A9 | 1/2013 | Ellingham et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040711 A1 | 2/2013 | Kim et al. |
| 2013/0072172 A1 | 3/2013 | Chang et al. |
| 2013/0084847 A1 | 4/2013 | Tibbitts et al. |
| 2013/0093707 A1 | 4/2013 | Park et al. |
| 2013/0130742 A1 | 5/2013 | Dietz et al. |
| 2013/0188503 A1 | 7/2013 | Anepu et al. |
| 2013/0225151 A1 | 8/2013 | King |
| 2013/0225152 A1 | 8/2013 | Matthews, III |
| 2013/0295872 A1 | 11/2013 | Guday |
| 2013/0295913 A1 | 11/2013 | Matthews |
| 2013/0298037 A1 | 11/2013 | Matthews |
| 2013/0303143 A1 | 11/2013 | Schrader |
| 2013/0305319 A1 | 11/2013 | Matthews |
| 2013/0305354 A1 | 11/2013 | King |
| 2014/0068755 A1 | 3/2014 | King |
| 2015/0011203 A1 | 1/2015 | Schrader |
| 2015/0213252 A1 | 7/2015 | Wilairat |
| 2015/0286840 A1 | 10/2015 | Karlson et al. |

FOREIGN PATENT DOCUMENTS

| | | |
|---|---|---|
| CN | 101617304 A | 12/2009 |
| CN | 101778165 | 7/2010 |
| CN | 101828162 | 9/2010 |
| EP | 2169946 | 3/2010 |
| EP | 2293016 | 3/2011 |
| EP | 2369864 | 9/2011 |
| EP | 2469442 | 6/2012 |
| JP | 07203015 | 8/1995 |
| JP | 2002142010 | 5/2002 |
| JP | 2002-530783 A | 9/2002 |
| JP | 2003032353 | 1/2003 |
| JP | 2007257140 | 10/2007 |
| JP | 2009521753 | 6/2009 |
| JP | 2010503082 | 1/2010 |
| KR | 20050037613 | 4/2005 |
| KR | 20100083396 | 7/2010 |
| KR | 10-2011-0093528 A | 8/2011 |
| WO | WO-2005031544 | 4/2005 |
| WO | WO-2006088273 | 8/2006 |
| WO | WO-2006099535 | 9/2006 |
| WO | WO-2007130123 | 11/2007 |
| WO | WO-2009105666 | 8/2009 |
| WO | WO-2011135359 | 11/2011 |
| WO | WO-2012047412 | 4/2012 |
| WO | WO-2013061156 | 5/2013 |

OTHER PUBLICATIONS

"Distracted Driving Information Clearinghouse", Retrieved from <http://www.fcc.gov/encyclopedia/distracted-drivind-information-clearinghouse>, (Jul. 27, 2011), 4 pages.

"iCloud: What You Need to Know", MacWorld.com, retrieved from <http://www.macworld.com/article/160380/2011/06/icloud_what_you_need_to_know.html.> on Dec. 13, 2011,(Jun. 8, 2011),16 pages.

"Parental Control Software for Cell Phones", retrieved from <http://www.parentalcontrolcellphones.com/> on Dec. 8, 2011,(Apr. 30, 2010), 5 pages.

"Safe Driving System", Retrieved from <http://web.archive.org/web/20100512220953/http://key2safedriving.com/>, (May 12, 2010), 2 pages.

"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011,(Jan. 7, 2010), 2 pages.

Bilderbeek, Pim "From Unified to Social Communications and Collaboration", retrieved from <http://www.themetisfiles.com/2011/10/from-unified-to-social-communications-and-collaboration/> on Dec. 13, 2011,(Oct. 25, 2011), 4 pages.

Davies, Chris "T-Mobile UK to Offer ICD Vega 15-inch Tegra Android Tablet in 2010", Retrieved from <http://wvwv.slashgear.com/t-mobile-uk-to-offer-icd-vega-15-inch-tegra-android-tablet-in-2010-0768671/> on Mar. 11, 2013, (Jan. 7, 2010), 7 pages.

Dipane, Jared "Sprint to Bring Parental Locks to Android Phones to Prevent Use While Driving", retrieved from <http://www.

(56) References Cited

OTHER PUBLICATIONS androidcentral.com/sprint-bring-parental-locks-android-phones-prevent-use-while-driving> on Dec. 8, 2011,(Mar. 22, 2011), 7 pages.

Kharif, Olga "Parental Controls for Mobile Phones? from You Bet", *Tech Beat*, retrieved from <http://www.businessweek.com/the_thread/techbeat/archives/2005/08/parental_contro.ht.ml> on Dec. 8, 2011,(Aug. 16, 2005), 12 pages.

Leblanc, Brandon "The Device Experience in Windows 7—Updated", *Windows 7 Team Blog*, retrieved from <http://windowsteamblog.com/windows/archive/b/windows7/archive/2009/09/01/the-device-experience-in-windows-7-updated.aspx> on Dec. 13, 2011,(Sep. 1, 2009), 14 pages.

Mui, Chunka "The Lifesaving Smartphone Feature That We Need: Driving Mode", Retrieved from <http://www.forbes.com/sites/chunkamui/2011/12/19/the-smart-phone-feature-that-we-need-driving-mode/>, (Dec. 19, 2011), 4 pages.

Nasar, Jack et al., "Mobile Telephones, Distracted Attention, and Pedestrian Safety", *Accident Analysis & Prevention*, retrieved from <http://facweb.knowlton.ohiostate.edu/jnasar/crpinfo/research/MobilePhones_AAP_2007.pdf> on Dec. 8, 2011,(Jan. 2008), pp. 69-75.

Patten, Christopher J., et al., "Using Mobile Telephones: Cognitive Workload and Attention Resource Allocation", *Accident Analysis and Prevention*, retrieved from <http://beta.nsc.org/safety_road/Distracted_Driving/Documents/Using%20mobile%20telephones,%20cognitive%20workload%20-and%20attention%20resource%20allocation.pdf> on Dec. 8, 2011,(May 2004), pp. 341-350.

Saenz, Aaron "Unlock Your Door with Your Phone, Text a Key to a Friend—Lockitron is Awesome (video)", Retrieved from: <http://singularityhub.com/2011/05/24/unlock-your-door-with-your-phone-text-a-key-to-a-friend-lockitron-is-awesome-video/> on Feb. 10, 2012,(May 24, 2011), 4 pages.

Tiemann, Amy "AT&T Adds Parental Control Options to Cell Phones", *CNET News*, retrieved from <http://news.cnet.com/8301-13507_3-9770506-18.html> on Dec. 8, 2011,(Sep. 7, 2007), 1 pages.

Warren, Tom "Microsoft Flaunts Metro Style PowerPoint Live Tiles", *WinRumors*, retrieved from <http://www.winrumors.com/microsoft-flaunts-metro-style-powerpoint-live-tiles-video/> on Dec. 13, 2011,(Jul. 11, 2011),12 pages.

Williams, Harold "AT&T Drive Mode, The Anti-Texting While Driving Mobile Solution (video)", Retrieved from <http://www.talkandroid.com/66579-att-drive-mode-the-anti-texting-while-driving-mobile-solution-video/>, (Oct. 13, 2011), 6 pages.

Wood, Molly "Hey, Phone Makers: Where's 'Driving Mode'?", Retrieved from <http://news.cnet.com/8301-31322_3-20003824-256.html>, (Apr. 29, 2010), 3 pages.

"EP Search Report", EP Application No. 09747072.8, Jan. 17, 2003, 5 Pages.

"Final Office Action", U.S. Appl. No. 12/194,213, Sep. 20, 2011, 11 Pages.

"Final Office Action", U.S. Appl. No. 12/417,752, Jul. 17, 2013, 18 pages.

"Final Office Action", U.S. Appl. No. 12/417,752, Sep. 13, 2012, 18 pages.

"Final Office Action", U.S. Appl. No. 12/912,456, Jan. 9, 2013, 21 pages.

"Final Office Action", U.S. Appl. No. 12/912,456, Sep. 6, 2013, 22 pages.

"Final Office Action", U.S. Appl. No. 13/090,474, Nov. 21, 2013, 12 pages.

"Foreign Office Action", CN Application No. 200980128048.8, May 6, 2013, 7 Pages.

"Foreign Office Action", CN Application No. 200980128048.8, Dec. 19, 2012, 11 Pages.

"Ignite Where & Launch Pad", O'Reilly, Where 2.0 Conference 2008, retrieved from <http://en.oreilly.com/where2008/public/schedule/detail/2572> on Feb. 5, 2009,May 2008, 4 pages.

"International Search Report and Written Opinion", Application No. PCT/US2013/050963, Nov. 8, 2013, 14 pages.

"International Search Report and Written Opinion", Application No. PCT/US2009/039509, Nov. 18, 2009, 8 Pages.

"International Search Report and Written Opinion", Application No. PCT/US2012/071557, Mar. 28, 2013, 9 pages.

"International Search Report and Written Opinion", Application No. PCT/US2012/071562, Apr. 24, 2013, 9 pages.

"International Search Report and Written Opinion", Application No. PCT/US2012/034598, Oct. 12, 2012, 9 pages.

"iPad Parental Control (restricting app access)", iPad Reviews, Jailbreak Guides; last retrieved from http://ipaded.net/ipad/parental-control/ on Feb. 29, 2012, 5 pages.

"No Tech Panacea for Tech-Distracted Driving", http://mobile.slashdot.org/story/12/06/11/0556231/no-tech-panacea-for . . . , Dec. 6, 2011, 30 Pages.

"Non Final Office Action", U.S. Appl. No. 12/417,752, Jun. 28, 2011, 14 pages.

"Non Final Office Action", U.S. Appl. No. 13/222,538, Feb. 14, 2013, 33 Pages.

"Non-Final Office Action", U.S. Appl. No. 12/194,213, Mar. 17, 2011, 11 Pages.

"Non-Final Office Action", U.S. Appl. No. 12/417,752, Feb. 25, 2014, 22 pages.

"Non-Final Office Action", U.S. Appl. No. 12/417,752, Oct. 29, 2013, 16 Pages.

"Non-Final Office Action", U.S. Appl. No. 12/417,752, May 24, 2013, 17 pages.

"Non-Final Office Action", U.S. Appl. No. 12/912,456, May 4, 2012, 14 pages.

"Non-Final Office Action", U.S. Appl. No. 12/912,456, May 29, 2013, 20 pages.

"Non-Final Office Action", U.S. Appl. No. 12/912,456, Sep. 11, 2012, 15 pages.

"Non-Final Office Action", U.S. Appl. No. 13/090,474, Apr. 26, 2013, 11 pages.

"Non-Final Office Action", U.S. Appl. No. 13/726,099, Mar. 18, 2014, 8 pages.

"Notice of Allowance", U.S. Appl. No. 12/194,213, May 31, 2013, 11 Pages.

"Notice of Allowance", U.S. Appl. No. 12/194,213, Jun. 27, 2012, 16 Pages.

"Notice of Allowance", U.S. Appl. No. 12/194,213, Dec. 21, 2012, 13 Pages.

"Notice of Allowance", U.S. Appl. No. 12/912,456, Jan. 7, 2014, 9 Pages.

"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.

"Restriction Requirement", U.S. Appl. No. 13/726,097, Mar. 21, 2014, 7 pages.

"Setting Up Simple Restricted Access", Retrieved at: http://support.webvanta.com/support_article/615777-setting-up-simple-restricted-access—on Feb. 29, 2012, 3 Pages.

"What's an Android? and Other Smart(phone) Questions", Retrieved from: <http://bestbuybusinessdistrict.com/knowlege-center/58-what%27s-an-android-and-other-smart-phone-questions> on Feb. 7, 2011, Sep. 6, 2010, 4 pages.

Aalto, et al.,' "Bluetooth and WAP Push Based Location-Aware Mobile Advertising System", ACM, MobiSYS '04, Jun. 6-9, 2004, Boston, MA, retrieved from <http://www.mediateam.oulu.fi/publications/pdf/496.pdf> on Feb. 5, 2009,Jun. 6, 2004, 10 pages.

Abdelzaher, et al.,' "Mobiscopes for Human Spaces", IEEE Pervasive Computing, vol. 6, No. 2, Apr. 2007, 11 pages.

Abdesslem, et al.,' "Less is More: Energy-Efficient Mobile Sensing with SenseLess", MobiHeld an ACM SIGCOMM workshop, Aug. 17, 2009, pp. 61-62.

Agarwal, et al.,' "Somniloquy: Augmenting Network Interfaces to Reduce PC Energy Usage", Symposium on Networked Systems Design and Implementation (NSDI), 2009, available at <http://www.usenix.org/events/nsdi09/tech/full_papers/agarwal/agarwal.pdf>,Apr. 23, 2009, pp. 365-380.

(56) References Cited

OTHER PUBLICATIONS

Aventail, et al.,' "Aventail and Trust Digital Launch Integrated Secure Mobile Access Solution", http://findarticles.com/p/articles/mi_pwwi/is_200602/ai_n16063742/?tag=content;co11, Last accessed May 14, 2008,Feb. 2006, 3 Pages.

Azizyan, et al.,' "SurroundSense: Mobile Phone Localization Using Ambient Sound and Light", retrieved from <http://synrg.ee.duke.edu/papers/surroundsense-poster.pdf> on Feb. 5, 2009, Sep. 22, 208, 1 page.

Bahl, et al.,' "RADAR: An In-Building RF-based User Location and Tracking System", Microsoft Research, Proceedings of IEEE Infocom 2000, Tel-Aviv, Israel, retrieved from <https://3 research.microsoft.com/en-us/um/people/padmanab/papers/infocom2000.pdf> on Feb. 5, 2009,Mar. 2000, 10 pages.

Balakrishnan, et al.,' "ITR: Scalable Location-Aware Monitoring (SLAM) Systems", Laboratory for Computer Science & Department of EECS, MIT, Cambridge, MA, retrieved from <http://nms.lcs.mit.edu/projects/slam/prop.pdf> on Feb. 5, 2009,Nov. 9, 2001, 31 pages.

Barroso, et al.,' "The Case for Energy-Proportional Computing", IEEE Computer Society, vol. 40. No. 12, Dec. 2007, pp. 33-37.

Branscombe, "Kids Corner and Wallet", Retrieved from <http://www.techradar.com/reviews/pc-mac/software/operating-systems/windows-phone-8-1086692/review/6>, Jan. 25, 2012, 7 pages.

Burke, et al.,' "Participatory Sensing", WSW at SenSys, Oct. 31, 2006, 5 pages.

Campbell, et al.,' "Biometrically Enhanced Software-Defined Radios", Proc. Software Defined Radio Technical Conf, Orlando, Florida, Nov. 2003, 6 Pages.

Chiu, et al.,' "Playful Bottle: A Mobile Social Persuasion System to Motivate Healthy Water Intake", Proceedings of the 11th international conference on Ubiquitous computing, 2009, 10 pages.

Consolvo, "Flowers or a Robot Army?: Encouraging Awareness & Activity with Personal, Mobile Displays", Proceedings of the 10th International Conference on Ubiquitous Computing, vol. 12, No. 4, Publisher: ACM Press, Sep. 2008, 10 pages.

Constandache, et al.,' "Energy-Aware Localization Using Mobile Phones", retrieved from <http://www.cs.duke.edu/~ionut/2008_mobisys.pdf> on Feb. 5, 2009, Jun. 2008, 1 page.

Constandache, et al.,' "Energy-efficient Localization Via Personal Mobility Profiling", In Proceedings of MobiCASE 2009, Available at <http://synrg.ee.duke.edu/papers/mobicase09.pdf>,Oct. 2009, pp. 1-20.

Covington, et al.,' "Parameterized Authentication", Proc. 9th European Symposium on Research Computer Security, Lecture notes in Computer Science, Sep. 2004, 18 Pages.

Flinn, "Extending Mobile Computer Battery Life through Energy-Aware Adaptation", School of Computer Science, Carnegie Mellon University, Pittsburgh, PA, retrieved from <http://reports-archive.adm.cs.cmu.edu/anon/2001/CMU-CS-01-171.pdf> from Feb. 5, 2009,Dec. 2001, 165 pages.

Foster, et al.,' "Precision and accuracy of an ankle-worn accelerometer-based pedometer in step counting and", Preventive Medicine, vol. 41, No. 3-4, Oct. 2005, pp. 778-783.

Gaonkar, et al.,' "Micro-Blog: Sharing and Querying Content through Mobile Phones and Social Participation", ACM, MobiSys 2008, Jun. 17-20, 2008, Breckenridge, CO, retrieved from <http://www.cs.duke.edu/~lpcox/romit-microblog.pdf> on Feb. 5, 2009,Jun. 17, 2008, 13 pages.

Hoffmann, et al.,' "Multilateral Security in Mobile Applications and Location Based Services", https://users.cs.jmu.edu/bernstdh/web/CS685/papers/hoffman-et-al-2002.pdf, Last accessed May 14, 2008,2002, 18 Pages.

Hoh, et al.,' "Virtual Trip Lines for Distributed Privacy-Preserving Traffic Monitoring", Proceedings of the 6th International Conference on Mobile Systems, Applications, and Services, Jun. 2008, 14 pages.

Hull, et al.,' "CarTel: A Distributed Mobile Sensor Computing System", Proceedings of the 4th international conference on Embedded networked sensor systems, Nov. 2006, 14 pages.

Jagadeesan, et al.,' "A Novel Approach to Design of User Re-Authentication Systems", Proc. 3rd IEEE Intl. Conf. on Biometrics: Theory, Applications and Systems, Sep. 2009, 6 Pages.

Kang, et al.,' "A Scalable and Energy-Efficient Context Monitoring Framework for Mobile Personal Sensor Networks", IEEE Transactions on Mobile Computing, vol. 9, No. 5, May 2010, pp. 686-702.

Kansal, et al.,' "Location and Mobility in a Sensor Network of Mobile Phones", Microsoft Research, Microsoft Corporation, retrieved from <http://research.microsoft.com/apps/pubs/defaultaspx?id=70416> on Feb. 5, 2009,Jun. 4, 2007, 1 pages.

King, et al.,' "Mobile Device Child Share", U.S. Appl. No. 13/726,095, Mar. 21, 2013, 57 Pages.

Klosterman, et al.,' "Secure Continuous Biometric-Enhanced Authentication", Technical Report, May 2000, May 2000, 25 Pages.

Kottahachchi, et al.,' "Access Controls for Intelligent Environments", In: Proceedings of ISDA '04: 4th Annual International Conference on Intelligent Systems Design and Applications. Budapest, Hungary (2004), 2004, 6 Pages.

Krumm, et al.,' "Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009,Sep. 17, 2006, 18 pages.

Krumm, et al.,' "RightSPOT: A Novel Sense of Location for a Smart Personal Object", Proceedings of Ubicomp 2003, Seattle, WA, retrieved from <http://research.microsoft.com/en-us/um/people/horvitz/rightspot.htm> on Feb. 5, 2009,2003, 1 pages.

Lamarca, et al.,' "Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009,2005, 18 pages.

Lester, et al.,' "Validated Caloric Expenditure Estimation using a Single Body-Worn Sensor", Proceedings of the 11th international conference on Ubiquitous computing, Oct. 2009, 10 pages.

Lester, et al.,' "A Practical Approach to Recognizing Physical Activities", Pervasive Computing in Pervasive Computing, vol. 3968, 2006, 17 pages.

Liao, et al.,' "Extracting Places and Activities from GPS Traces Using Hierarchical Conditional Random Fields", The International Journal of Robotics Research, vol. 26, No. 1, 119-134, retrieved from <http://ijr.sagepub.com/cgi/content/26/1/119> on Feb. 5, 2009,2007, 20 pages.

Lin, et al.,' "Enabling Energy-Efficient and Quality Localization Services", National Taiwan University, retrieved from <http://nslab.ee.ntu.edu.tw/publication/conf/gols-percom06.pdf> on Feb. 5, 2009,2006, 4 pages.

Lin, et al.,' "Energy-Accuracy Trade-off for Continuous Mobile Device Location", In Proceedings of ACM Mobisys 2010, Available at <http://research.microsoft.com/apps/pubs/default.aspx?id=120831>,Jun. 15, 2010, pp. 1-14.

Liu, et al.,' "xShare: Supporting Impromptu Sharing of Mobile Phones", In Proceedings of the 7th international conference on Mobile systems, applications, and services, Jun. 22, 2009, pp. 15-28.

Lu, et al.,' "Sound Sense: Scalable Sound Sensing for People-Centric Sensing Applications on Mobile Phones", Proceedings of the 7th international conference on Mobile systems, applications, and services, Jun. 2009, 14 pages.

McGlaun, "Fixes for Distracted Driving Remain Unclear", http://www.dailytech.com/article.aspx?newsid=24903, Jun. 12, 2012, 2 Pages.

Mohan, et al.,' "Nericell: Rich Monitoring of Road and Traffic Conditions using Mobile Smartphones", Proceedings of the 6th ACM conference on Embedded network sensor systems, Nov. 2008, 14 pages.

Oliver, et al.,' "Health Gear: A Real-Time Wearable System for Monitoring and Analyzing Physiological Signals", Apr. 2006, pp. 1-4.

Paek, et al.,' "Energy-Efficient Rate-Adaptive GPS-based Positioning for Smartphones", In Proceedings of MobiSys 2010, Available at <http://enl.usc.edu/papers/cache/Paek10a.pdf>,Jun. 2010, 16 pages.

Peng, et al.,' "BeepBeep: A High Accuracy Acoustic Ranging System Using COTS Mobile Devices", ACM, SenSys 2007, Nov. 6-9, 2007,

(56) References Cited

OTHER PUBLICATIONS

Sydney, Australia, retrieved from <http://research.microsoft.com/en-us/groups/wn/sensys106-beepbeep.pdf> on Feb. 5, 2009,Nov. 6, 2007, 14 pages.
Pering, et al.,' "The PSI Board: Realizing a Phone-Centric Body Sensor Network", In 4th International Workshop on Wearable and Implantable Body Sensor Networks, 2007, 6 pages.
Person, "Writing Your Own GPS Applications: Part 2", The Code Project, retrieved from <http://www.codeproject.com/KB/mobile/WritingGPSApplications2.aspx> on Feb. 5, 2009,Dec. 20, 2004, 13 pages.
Quick, "BizzTrust for Android splits a single smartphone into two virtual phones", http://www.gizmag.com/bizztrust-for-android/20114/, Retrieved on Jan. 10, 2012,Oct. 2011, 4 Pages.
Riva, et al.,' "The Urbanet Revolution: Sensor Power to the People!", IEEE Pervasive Computing, vol. 6, No. 2, Apr. 2007, pp. 41-49.
Ruairi, et al.,' "An Energy-Efficient, Multi-Agent Sensor Network for Detecting Diffuse Events", IJCA1-07—retrieved from <http://www.aaai.org/Papers/IJCAI/2007/IJCAI07-224.pdf> on Feb. 5, 2009, 2007, pp. 1390-1395.
Schindler, et al.,' "City-Scale Location Recognition", IEEE Computer Society Conference on Computer Vision and Pattern Recognition (CVPR), retrieved from <http://www.cc.gatech.edu/~phlosoft/files/schindler07cypr2.pdf> on Feb. 5, 2009,2007, 7 pages.
Shin, et al.,' "DEAMON: Energy-efficient sensor monitoring", 6th Annual IEEE Communications Society Conference on Sensor, Mesh and Ad Hoc Communications and Networks, Jun. 22, 2009, 9 pages.
Simonite, "One Smart Phone, Two Personalities", http://www.technologyreview.com/communications/38865/, Retrieved Jan. 10, 2012,Oct. 13, 2011, 3 Pages.
Smailagic, et al.,' "Location Sensing and Privacy in a Context-Aware Computing Environment", IEEE Wireless Communications—retrieved from <http://diuf.unifr.ch/pai/education/2002_2003/seminar/winter/telecom/01043849.pdf> on Feb. 5, 2009, Oct. 2002, pp. 10-17.
Stajano, "One user, many hats; and, sometimes, no hat?towards a secure yet usable pda", Security Protocols Workshop, Springer Verlag, 2004, 14 Pages.
Sun, et al.,' "Signal Processing Techniques in Network-aided Positioning", IEEE Signal Processing Magazine—Available at <http://www.cspl.umd.edu/sig/publications/sun_survey_200507.pdf>, Jul. 2005, pp. 12-23.
Talbot, "App Battles Driver Distraction but Spares Passengers", Technology Review India published by MIT, http://www.technologyreview.in/news/426889/app-battles-driver-distraction-but-spares-passengers,Feb. 14, 2012, 2 pages.
Temporale, "Removing Application Lock on Windows Mobile Standard Devices", http://www.mobilejaw.com/articles/2009/09/removing-application-lock-on-windows-mobile-standard-devices/, Retrieved on Oct. 13, 2011,Sep. 4, 2009, 10 Pages.
Wang, et al.,' "A Framework of Energy Efficient Mobile Sensing for Automatic User State Recognition", Proceedings of the 7th international conference on Mobile systems, applications, and services, Jun. 2009, 14 pages.
Weilenmann, et al.,' "Local Use and Sharing of Mobile Phones", In B. Brown, N. Green & R. Harper (Eds.) Wireless World: Social and Interactional Aspects of the Mobile Age. Godalming and Hiedleburg: Springer Verlag, 2001, pp. 99-115.
Woodman, et al.,' "Pedestrian Localisation for Indoor Environments", Proceedings of the 10th international conference on Ubiquitous computing, Sep. 2008, 10 pages.
Youssef, et al.,' "The Horus WLAN Location Determination System", Department of Computer Science, University of Maryland, retrieved from <http://www.cs.umd.edu/~moustafa/papers/horus_usenix.pdf> on Feb. 5, 2009,2005, 14 pages.
Yu, et al.,' "Personalized Awareness and Safety with Mobile Phones as Sources and Sinks", Proceedings of Urbansense, workshop held in conjunction with SenSys, Nov. 4, 2008, pp. 26-30.
Zaplata, "Context-based Cooperation in Mobile Business Environments—Managing the Distributed Execution of Mobile Processes", Business & Information Systems Engineering, Apr. 2009, pp. 301-314.
Zhang, et al.,' "The Two Facets of the Exploration-Exploitation Dilemma", Proceedings of the IEEE/WIC/ACM International Conference on Intelligent Agent Technology (IAT '06), retrieved from <http://ieeexplore.ieee.org/ielx5/4052878/4052879/04052945.pdf?tp=> on Feb. 5, 2009,2006, 7 pages.
Zhuang, et al.,' "Improving Energy Efficiency of Location Sensing on Smartphones", In Proceedings of MobiSys 2010—Available at <http://www.deutsche-telekom-laboratories.com/—kyuhan/papers/MobiSys10Kim.pdf>, Jun. 2010, 15 pages.
"International Search Report", Mailed Date: Apr. 25, 2013, Application No. PCT/US2012/071555, Filed date: Dec. 23, 2012, pp. 9.
Cui, Yanqing, "Facilitating Consumption of Online Social Networking Services on Mobile Devices", Proceedings of the 13th international conference on Ubiquitous computing, Sep. 17, 2011, pp. 4.
"Final Office Action", U.S. Appl. No. 13/222,538, May 28, 2013, 43 pages.
"Final Office Action", U.S. Appl. No. 13/875,139, May 9, 2014, 15 Pages.
"Foreign Notice of Allowance", CN Application No. 200980128048.8, Jun. 28, 2014, 6 Pages.
"Foreign Office Action", AU Application No. 2011312743, Jun. 20, 2014, 4 Pages.
"Foreign Office Action", CN Application No. 200980128048.8, Dec. 2, 2013, 7 pages.
"Foreign Office Action", CN Application No. 201110317851.5, Dec. 4, 2013, 14 pages.
"Foreign Office Action", CN Application No. 201110317851.5, May 8, 2014, 10 Pages.
"Foreign Office Action", EP Application No. 11831134.9, May 9, 2014, 3 Pages.
"International Search Report and Written Opinion", Application No. PCT/US2011/049614, Mar. 26, 2012, 7 pages.
"Non-Final Office Action", U.S. Appl. No. 12/897,586, May 8, 2014, 12 pages.
"Non-Final Office Action", U.S. Appl. No. 13/222,538, Oct. 11, 2013, 38 pages.
"Non-Final Office Action", U.S. Appl. No. 13/328,312, Aug. 6, 2013, 18 pages.
"Non-Final Office Action", U.S. Appl. No. 13/726,027, Jun. 24, 2014, 17 pages.
"Non-Final Office Action", U.S. Appl. No. 13/726,090, Jun. 24, 2014, 28 pages.
"Non-Final Office Action", U.S. Appl. No. 13/875,139, Oct. 3, 2013, 12 pages.
"Notice of Allowance", U.S. Appl. No. 13/726,097, Jun. 10, 2014, 7 pages.
"Restriction Requirement", U.S. Appl. No. 13/726,048, Jun. 20, 2014, 5 pages.
"Restriction Requirement", U.S. Appl. No. 13/726,049, Jul. 1, 2014, 6 pages.
"Supplementary Search Report", EP Application No. 11831134.9, Apr. 3, 2014, 3 pages.
Moran, et al.,' "Getting Started with Windows 7", 2009, 412 pages.
"Mobile Task Tracker Screen Shots", Retrieved from <http://www.mobiletasktracker.com/Scree%20Shots.html>, (Jul. 13, 2011), 4 Pages.
"PCT Search Report and Written Opinion", Application No. PCT/US2012/071545, (Mar. 28, 2013), 9 pages.
"PCT Search Report and Written Opinion", Application No. PCT/US2012/071559, (Mar. 28, 2013),10 pages.
"PCT Search Report and Written Opinion", Application No. PCT/US2012/071546, (Apr. 29, 2013), 10 pages.
Niino, Junichi "There was free enterprise microblogging, Japanese were developed "youRoom!" Free plan upgrade just mutter", Retrieved from <http://www.publickey1.jp/blog/10/youroom.html>, (Dec. 21, 2010), 4 Pages.
"Non-Final Office Action", U.S. Appl. No. 13/726,099, Jan. 7, 2015, 10 pages.

(56) References Cited

OTHER PUBLICATIONS

"Non-Final Office Action", U.S. Appl. No. 13/090,474, May 6, 2014, 12 pages.
"Non-Final Office Action", U.S. Appl. No. 13/726,095, Aug. 15, 2014, 12 pages.
"Non-Final Office Action", U.S. Appl. No. 13/726,048, Dec. 9, 2014, 12 pages.
"Final Office Action", U.S. Appl. No. 13/090,474, Nov. 25, 2014, 13 pages.
"Non-Final Office Action", U.S. Appl. No. 13/726,095, Jan. 5, 2015, 14 pages.
"Foreign Office Action", CN Application No. 201110317851.5, Nov. 14, 2014, 15 Pages.
"Final Office Action", U.S. Appl. No. 13/726,027, Jan. 5, 2015, 19 pages.
"How can I see a list of all users on the logon screen?", Retrieved from <http://superuser.com/questions/354856/how-can-i-see-a-list-of-all-users-on-the-logon-screen> on Jan. 6, 2015, Nov. 7, 2011, 2 pages.
"Foreign Notice of Allowance", AU Application No. 2011312743, Nov. 25, 2014, 2 Pages.
"Final Office Action", U.S. Appl. No. 12/417,752, Feb. 25, 2014, 22 Pages.
"Supplementary European Search Report", EP Application No. 12860631.6, Jan. 5, 2015, 3 pages.
"How can one add an image to the windows 7 login screen? A", Retrieved from <http://superuser.com/questions/470568/how-can-one-add-an-image-to-the-windows-7-login-screen > on Jan. 6, 2015., Sep. 5, 2012, 4 pages.
"Timeline of Microsoft Windows", Retrieved from <http://en.wikipedia.org/wiki/Timeline_of_Microsoft_Windows> on Jan. 6, 2015, Dec. 14, 2014, 5 pages.
"Restrict Access to Programs with AppLocker in Windows 7", Retrieved from <http://www.howtogeek.com/howto/6317/block-users-from-using-certain-applications-with-applocker/> on Jan. 6, 2015., Nov. 12, 2009, 9 pages.
"Non-Final Office Action", U.S. Appl. No. 13/726,049, Dec. 4, 2014, 9 pages.
Lifehacker, "Get the Most Out of Your iPhone's Notification Center, from Beginner to Jailbreaker", Available online at <http://lifehacker.com/5882947/get-the-most-out-of-ios-Ss-notification-center-frombeginner-to-jailbreakerI>, retrieved on Jul. 29, 2014, Feb. 7, 2012, 8 pages.
Osxdaily, "How to Use the lock Screen Camera in iOS 5.1", Available online at <http://osxdaily.com/2012/03/08/lock-screen-camera-ios-5-1>, retrieved on Jul. 29, 2014, Mar. 8, 2012, 10 pages.
"Corrected Notice of Allowance", U.S. Appl. No. 13/726,097, Aug. 21, 2014, 2 pages.
"Corrected Notice of Allowance", U.S. Appl. No. 13/726,097, Oct. 1, 2014, 2 pages.
"Final Office Action", U.S. Appl. No. 13/726,090, Oct. 2, 2014, 30 pages.
"Final Office Action", U.S. Appl. No. 13/726,099, Aug. 29, 2014, 10 pages.
"Foreign Office Action", AU Application No. 2011312743, Aug. 15, 2014, 4 Pages.
"Non-Final Office Action", U.S. Appl. No. 13/726,043, Sep. 11, 2014, 14 pages.
"Non-Final Office Action", U.S. Appl. No. 13/875,139, Oct. 24, 2014, 15 Pages.
"Notice of Allowance", U.S. Appl. No. 12/897,586, Oct. 15, 2014, 13 Pages.
"Welcome to Sprint Drive First", Retrieved at <<https://drivefirst.sprint.com/welcome.htm>> on Nov. 20, 2013, (2013), 2 pages.
Samberg, David "Stay Focused While Driving", Retrieved from <<http://www.verizonwireless.com/news/2012/09/safely-go-driving-app.html>> on Nov. 20, 2013, (Sep. 13, 2012), 5 pages.
"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.
"Extended European Search Report", EP Application No. 12859600.4, May 13, 2015, 7 pages.
"Final Office Action", U.S. Appl. No. 13/726,043, Mar. 3, 2015, 19 pages.
"Final Office Action", U.S. Appl. No. 13/726,095, May 8, 2015, 13 pages.
"Final Office Action", U.S. Appl. No. 13/726,099, May 8, 2015, 11 pages.
"Foreign Office Action", CL Application No. 201300886, Feb. 2, 2015, 7 pages.
"Foreign Office Action", EP Application 12859972.7, May 26, 2015, 4 pages.
"Foreign Office Action", EP Application No. 12859485.0, Feb. 12, 2015, 5 pages.
"Foreign Office Action", EP Application No. 12860631.6, Feb. 16, 2015, 5 pages.
"In Case of Emergency (ICE) and smart phone with lock screens", Ars Technica Open Forum—Retrieved at: http://arstechnica.com/civis/viewtopic.php?f=20&t=1140661, Mar. 29, 2011, 8 pages.
"Mobile Phone Match-Up", Retrieved at: <http://www.microsoft.com/windowsmobile/enus/meet/version-compare.mspx>, Jul. 27, 2010, 4 pages.
"Non-Final Office Action", U.S. Appl. No. 13/726,040, Jan. 28, 2015, 14 pages.
"Notice of Allowance", U.S. Appl. No. 12/897,586, Jan. 5, 2015, 7 Pages.
"Notice of Allowance", U.S. Appl. No. 13/875,139, Mar. 5, 2015, 7 pages.
"Setting up and Using Smart Unlock on the Samsung Jet", Retrieved at: <http://www.knowyourmobile.com/samsung/samsungjet/samsungjetuserguides/317988/setting_up_and_using_smart_unlock_on_the_samsung_jet.html>, Jun. 20, 2010, 2 pages.
"Supplemental Notice of Allowance", U.S. Appl. No. 12/897,586, Mar. 3, 2015, 2 Pages.
"Supplementary European Search Report", EP Application No. 12859485.0, Jan. 23, 2015, 4 pages.
"Supplementary European Search Report", EP Application No. 12859972.7, Apr. 30, 2015, 3 pages.
"T-Mobile G1 Google Android Phone—Gesture Unlocking", Retrieved at: <http://www.gadgetuniversegift.com/?p=2121>, Jun. 20, 2010, 2 pages.
"T-Mobile G1 User Manual", pp. 102-103, May 27, 2009, 5 pages.
Bhandari,"Full Touchscreen Samsung Star (S5233), Star 3G (S5603) and BEAT DJ Launched in India", Retrieved at: http://www.tecfre.com/full-touchscreen-samsung-star-s5233-star-3g-s5603-and-beat-dj-launched-in-india/, May 11, 2009, 12 pages.
Chen,"Here's the Google Phone Apple Wants You to Have", Retrieved at: http://www.wired.com/2010/03/apple-htc-google/, Mar. 5, 2010, 9 pages.
Ciprian,"Manage User Accounts", Retrieved at: http://www.vista4beginners.com/Manage-User-Accounts, May 8, 2007, 13 pages.
Raja,"How to Replace and Customize Android Lock Screen [Guide]", Retrieved at: http://www.addictivetips.com/mobile/how-to-replace-and-customize-android-lock-screen-guide/, Jun. 10, 2011, 14 pages.
"Final Office Action", U.S. Appl. No. 12/897,586, May 22, 2013, 4 pages.
"Final Office Action", U.S. Appl. No. 14/686,300, Jul. 29, 2015, 13 pages.
"Foreign Office Action", CL Application No. 201300886, May 13, 2015, 7 pages.
"Foreign Office Action", CN Application 201110317851.5, May 20, 2015, 8 pages.
"Foreign Office Action", EP Application No. 12859600.4, Jun. 1, 2015, 8 Pages.
"Foreign Office Action", EP Application No. 12860373.5, Jul. 7, 2015, 6 pages.

(56) References Cited

OTHER PUBLICATIONS

"Foreign Office Action", JP Application No. 2013-532806, Jun. 10, 2015, 11 pages.
"Non-Final Office Action", U.S. Appl. No. 12/897,586, Oct. 18, 2012, 12 pages.
"Non-Final Office Action", U.S. Appl. No. 13/726,049, Jul. 7, 2015, 14 pages.
"Non-Final Office Action", U.S. Appl. No. 13/726,090, Jun. 23, 2015, 31 pages.
"Non-Final Office Action", U.S. Appl. No. 14/495,418, Jul. 2, 2015, 18 pages.
"Non-Final Office Action", U.S. Appl. No. 14/686,300, Jun. 8, 2015, 11 pages.
"Supplementary European Search Report", EP Application No. 12860373.5, Jun. 25, 2015, 3 pages.
Non-Final Office Action Issued in U.S. Appl. No. 13/090,474, Mailed Date: Apr. 8, 2015, 11 Pages.
Non-Final Office Action Issued in U.S. Appl. No. 13/726,027, Mailed Date: Aug. 13, 2015, 20 Pages.
Non-Final Office Action Issued in U.S. Appl. No. 13/726,040, Mailed Date: Aug. 25, 2015, 16 Pages.
Non-Final Office Action Issued in U.S. Appl. No. 13/726,043, Mailed Date: Oct. 8, 2015, 20 Pages.
Final Office Action Issued in U.S. Appl. No. 13/726,048, Mailed Date: Aug. 5, 2015, 13 Pages.
Office Action Issued in Israel Patent Application No. 225450, Mailed Date: Aug. 13, 2015, 6 Pages.
Hayama, et al., "Windows Vista Home Premium/Home Basic/Business", Impress Japan Corporation, First Edition, Mar. 21, 2007, pp. 748-776. (W/o English Translation).
International Preliminary Report on Patentability Issued in PCT Patent Application No. PCT/US2012/071545, Mailed Date: Jul. 3, 2014, 6 Pages.
International Preliminary Report on Patentability Issued in PCT Patent Application No. PCT/US2012/071546, Mailed Date: Jul. 3, 2014, 7 Pages.
International Preliminary Report on Patentability Issued in PCT Patent Application No. PCT/US2012/071555, Mailed Date: Jul. 3, 2014, 5 Pages.
International Preliminary Report on Patentability Issued in PCT Patent Application No. PCT/US2012/071557, Mailed Date: Jul. 3, 2014, 6 Pages.
International Preliminary Report on Patentability Issued in PCT Patent Application No. PCT/US2012/071559, Mailed Date: Jul. 3, 2014, 7 Pages.
International Preliminary Report on Patentability Issued in PCT Patent Application No. PCT/US2012/071562, Mailed Date: Mar. 12, 2015, 6 Pages.
Non-Final Rejection Issued in U.S. Appl. No. 14/686,300, Mailed Date: Nov. 30, 2015, 12 Pages.
Final Office Action Issued in U.S. Appl. No. 13/726,040, Mailed Date: Dec. 1, 2015, 18 Pages.
Non-Final Office Action Issued in U.S. Appl. No. 13/726,048, Mailed Date: Nov. 20, 2015, 15 Pages.
Final Office Action Issued in U.S. Appl. No. 13/726,090, Mailed Date: Dec. 15, 2015, 35 Pages.
First Office Action and Search Report Issued in Chinese Patent Application No. 201280064066.6, Mailed Date: Jan. 21, 2016, 12 Pages.

\* cited by examiner

PRIVATE INTERACTION HUBS

RELATED APPLICATION

This application claims priority to U.S. Provisional Application Ser. No. 61/580,143 filed Dec. 23, 2011 entitled "Mobile Devices Family Coordination", the disclosure of which is incorporated by reference herein in its entirety.

BACKGROUND

Many types of devices, such as mobile phones, tablet devices, and other computing, communication, and entertainment devices increasingly offer more functions, applications, and features which are beneficial to a user, and can enhance one's personal time as well as work and social activities. However, even with the many communication applications for email, text, and instant messaging, as well as the seemingly unlimited number of third-party organization-centric applications that are available to users of the devices, such as calendar, list, and other types of user data-sharing applications, it can still be difficult or inefficient for families or other groups of people to collectively get together the many different ent resources and unrelated applications to effectively coordinate efforts.

SUMMARY

This Summary introduces features and concepts of private interaction hubs, which is further described below in the Detailed Description and/or shown in the Figures. This Summary should not be considered to describe essential features of the claimed subject matter, nor used to determine or limit the scope of the claimed subject matter.

Private interaction hubs are described. In embodiments, a mobile device has memory storage to maintain hub data that is associated with a private interaction hub, where the hub data includes multiple types of displayable data. Each type of displayable data is editable by a respective different type of device application. The memory storage at the device also maintains private data that is displayable and is viewable with one of the device applications. The mobile device also includes a display device to display the multiple types of the hub data in a hub user interface of a hub application. The hub user interface is generally not used to display private data. The display device can also display, in an application user interface different than the hub user interface, the private data and a subset of the hub data of a particular type that is associated with one of the device applications in a device application user interface.

In embodiments, the subset of the hub data that is displayed in the hub user interface can be selected to initiate the subset of the hub data being displayed in the device application user interface in conjunction with the private data. Similarly, the subset of the hub data that is displayed in the device application user interface can be selected to initiate the subset of the hub data being displayed in the hub user interface with the multiple types of the hub data. The private interaction hub associates members of the hub for private interaction, and each of the hub members have an associated mobile device. The multiple types of the hub data is viewable in the hub user interface that is displayable at each of the associated mobile devices of the members of the private interaction hub.

In embodiments, a hub operating system service is implemented to integrate the device applications with an operating system of the mobile device to implement the private interaction hub. The hub operating system service can receive social network updates for one or more members of the private interaction hub, and then aggregate the social network updates for display in the hub user interface. The hub operating system service can also integrate a third-party application with the private interaction hub, where third-party application data is displayable in the hub user interface in conjunction with the hub data. The hub operating system service is also implemented to manage multi-user interactive updates to an event that is coordinated in the private interaction hub. The hub operating system service can initiate an invitation to join the private interaction hub as an SMS message that is communicated by a hub management service to a new member mobile device, and the hub operating system service receives hub metadata that associates the new member in the private interaction hub based on an account identifier associated with the new member.

BRIEF DESCRIPTION OF THE DRAWINGS

Embodiments of private interaction hubs are described with reference to the following Figures. The same numbers may be used throughout to reference like features and components that are shown in the Figures.

DETAILED DESCRIPTION

Embodiments of private interaction hubs (or simply "hubs"), as well as systems, methods, user interfaces, services, and applications to support the private interaction hubs, are described. A private interaction hub is a private network or association of member users who voluntarily elect to privately interact and collaborate with each other in a bi-directional manner, such as by interacting and collaborating from multiple applications installed on their mobile devices. For example, the members of a private interaction hub may interact by exchanging hub messages, status updates, event notifications, and/or location "check-ins" that are shared with each other. As another example, the members of a private interaction hub may collaboratively curate or edit a collection of shared content such as shared notes, documents, tasks, photos, contacts, calendar events, location updates, applications (to include collaborative gaming applications), and/or other media content, such as any type of audio, music, video, and/or image data. As yet another example, the members of a private interaction hub may interactively participate in collaborative multi-player games or other multi-user applications.

A member user of a private interaction hub may access, create, and/or modify hub data, such as shared messages, content, events, media, and application data through multiple applications on a single mobile device. For example, a member of a "golf hub" may access a hub message sent to the hub members through the user interface of a native messaging application on his or her mobile device, and also access this same message through a hub user interface of a hub application that presents the hub message in conjunction with other hub data from the "Golf hub," such as shared calendar events relating to golf outings. A private interaction hub can be provisioned for any association of people, such as family members, coworkers, friends, neighbors, and/or other groups of people. Additionally, a member user of one private interaction hub may also be a member of multiple hubs, which can be based on a single member sign-on that identifies the member user for association in a single private interaction hub, or in multiple hubs.

While features and concepts of private interaction hubs can be implemented in any number of different devices, systems, networks, environments, and/or configurations, embodiments of private interaction hubs are described in the context of the following example devices, systems, and methods.

Figure 1:
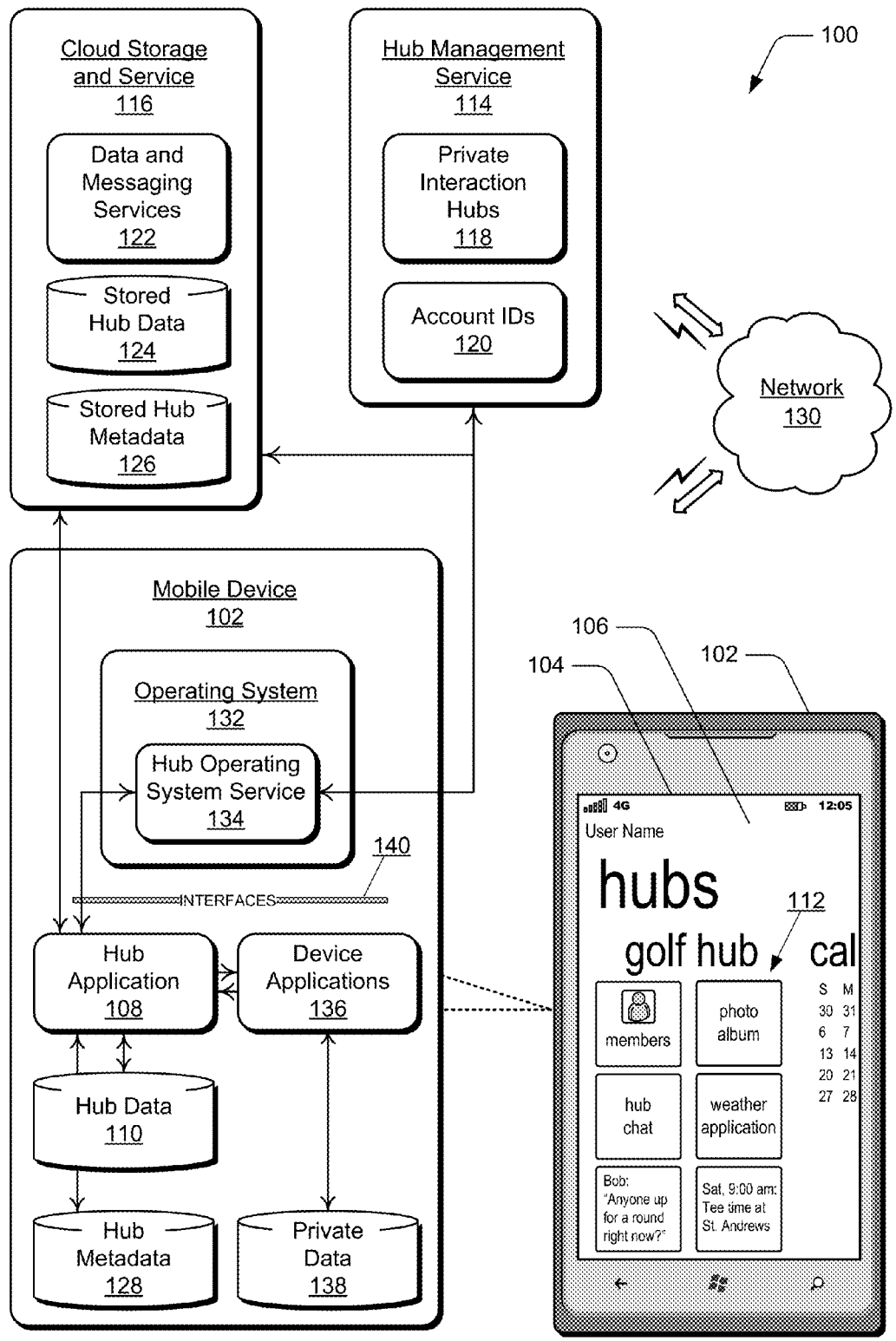
FIG. 1 illustrates an example system in which embodiments of private interaction hubs can be implemented.

FIG. 1 illustrates an example system 100 in which embodiments of private interaction hubs can be implemented. The system 100 includes an example mobile device 102, which may be any one or combination of a wired or wireless device, such as a mobile phone, tablet, computing, communication, entertainment, gaming, media playback, and/or other type of device. Any of the devices can be implemented with various components, such as a processing system and memory, as well as any number and combination of differing components as further described with reference to the example device shown in FIG. 4.

The mobile device 102 includes an integrated display device 104 on which user interfaces can be displayed, such as a hub user interface 106 of a hub application 108. The hub application 108 aggregates disparate types of the hub data 110 originating from the various member users of the private interaction hub. Thus, the hub user interface offers a unified interactive view of or access to different kinds of hub data 110 for a single, private interaction hub. For example, the hub user interface may provide a single unified access point to shared hub messages, status updates, check-ins, hub calendar events, hub media, hub applications, and other types of hub content. As described above, a private interaction hub (or simply "hub") is a private network or association of member users who voluntarily elect to privately interact and collaborate with each other in a bi-directional manner. The hub data 110 includes any shared data or metadata that is used to facilitate the interaction and collaboration between the members of a private interaction hub, and may include shared data for messaging, notes, contact management, documents, tasks, location updates, photos, calendar events, applications (to include collaborative gaming applications), and/or other media content, such as any type of audio, music, video, and/or image data that may be available or accessed from any source.

The basic functionality of an example private interaction hub is shown as a golf hub displayed in the hub user interface 106 of the hub application 108. For example, the hub user interface can include various selectable user interface tiles 112, such as a members tile that is selectable to initiate a display of the constituent members of the private interaction hub. The user interface tiles 112 may also include hub chat and/or messages tiles to allow a hub member to participate in messaging threads with the other member users of the hub. For example, as shown, the member "Bob" has asked "Anyone up for a round right now?" The user interface tiles 112 may also include a photo album tile that is selectable to view photos shared by any of the hub members with the hub, and a shared notebook tile from which the hub members can view shared notes. For example, the golf hub may include a shared notes document that compiles the hub members' collective research of new golf equipment. The hub user interface 106 may also display a shared calendar that allows a member of the hub to view, edit, and post calendar events that will be shared with all of the other hub members. For example, the calendar tile shows an upcoming tee time at St. Andrews on Saturday at 9:00 a.m. for all of the members. When a user selects a group item (e.g., the message from Bob) or tile (e.g., the messaging tile), further details about the selected item or group items related to the selected tile may be displayed by the hub application itself or the hub application may call a different device application 136 (e.g., a messaging application) to display further details about the item(s).

When a user selects or otherwise engages with a piece of displayed hub data, such as the golf message from Bob, the hub application may provide additional details or options to the user to permit the user to interact further with the hub data. For example, the hub application may display controls to allow the user to edit or reply to Bob's message. Alternatively or in addition, when a user selects or otherwise engages with a piece of displayed hub data (e.g., Bob's message), the hub application may launch or call another device application to permit the user to further interact with the piece of hub data (e.g., the hub application may call a native messaging application).

The hub user interface 106 of the hub application 108 can also include user-selectable access to third-party applications, such as when an application is "pinned" to, or otherwise shared with a private interaction hub. A pinned third-party application may also utilize the shared hub data, such as shared application preferences or shared application state data. For example, the golf hub shown displayed in the hub user interface 106 includes a live tile representing a third-party weather application that the members of the hub can quickly access to check the weather forecast at their local golf club, such as when planning an upcoming golf outing. A user of the mobile device 102 can also customize display aspects of a hub user interface, such as the content of the user interface and how the elements of the hub user interface are arranged. Another example of a hub user interface of the hub application 108 is a panoramic hub user interface, such as for a family-centric private interaction hub as shown and described in greater detail with reference to FIG. 7.

The example system 100 also includes a hub management service 114, and a cloud storage and service 116. The hub management service 114 manages the formation and maintenance of private interaction hubs 118. The hub management service can correlate or associate member users of a hub by associating account identifiers 120 of the members with one or more of the private interaction hubs. The account identifier 120 of a member user may be associated with an identifier of a private interaction hub 118 in a data table that the hub management service maintains to correlate the hub members with one or more of the private interaction hubs. The hub management service 114 may also associate devices that correspond to hub members based on device identifiers. The account identifiers 120 can include user membership identifiers and/or sign-on credentials, such as an email and password combination, or a username and password combination.

The sign-on credentials may be single sign-on ("SSO") credentials that are utilized for authentication purposes at a number of Web services, including the cloud storage and service 116.

The cloud storage and service 116 can include any type of cloud-based (e.g., network-based) data and messaging services 122. The messaging services may include any type of email, text (e.g., SMS, MMS), and/or instant messaging services. The data services may include any type of calendar, photo album, file or document sharing, location, mapping, music sharing, video sharing, gaming, contacts management, and/or notebook services, as well as any other type of services that can be used to share stored hub data 124. The stored hub data can include any form of messages, updates, events, content, media, and information that is maintained for the private interaction hubs 118, and is accessible from the mobile device 102, either upon a request from a device and/or upon a data "push" to the device. The cloud storage and service 116 also maintains stored hub metadata 126 that includes settings and information pertaining to the private interaction hubs 118, such as the name of a hub, the background image or photo of the hub, and an association of the hub members.

Although shown together as data and messaging services 122, various application data services and various messaging services may be operated on separate devices and/or operated by separate, distinct entities. Additionally, although the hub management service 114 and the cloud storage and service 116 are shown as independent services, they may be implemented together as a single service. Further, a server device (or group of server devices) can include implementations of both the hub management service 114 and the cloud storage and service 116, representative of a single entity that may be the same server system, company system, domain, and the like.

The cloud storage and service 116, and its constituent data and messaging services 122, interchange the stored hub data 124 and the stored hub metadata 126 between the mobile devices that are associated with member users of a private interaction hub 118. For example, a data and/or messaging service of the cloud storage and service 116 can receive a copy of hub data 110 and/or hub metadata 128 from the mobile device 102 that is used by a hub member, store this hub data and hub metadata in the cloud storage as the respective stored hub data 124 and stored hub metadata 126, and then distribute the stored hub data and stored hub metadata to other mobile devices associated with other member users of the same private interaction hub, as well as to other mobile devices associated with the same hub member. The stored hub metadata 126 can include membership information pertaining to the member users of a private interaction hub, hub identifiers that correlate a piece of hub data to a particular private interaction hub, user identifiers that correlate a piece of hub data to a particular member user, modification dates, and/or other metadata.

The cloud storage and service 116, and its constituent data and messaging services 122, may utilize single sign-on ("SSO") credentials for authentication purposes to limit the dissemination of the stored hub data 124 and the stored hub metadata 126 to only the authorized devices of hub members. Additionally, any of the devices and services (e.g., implemented as server devices) described herein can communicate via a network 130, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized, such as multiple devices connected using a peer-to-peer communication network.

The mobile device 102 includes an operating system 132 of the device, and the operating system includes a hub operating system service 134 that is implemented to integrate cloud-based services, a hub application 108, and local device applications 136 with the operating system to implement aspects of the private interaction hubs 118. The aspects that may be implemented include hub formation and membership maintenance, synchronizing the hub data 110 on the mobile device with the stored hub data 124, and the hub metadata 128 with the stored hub metadata 126, with the cloud storage and service 116, and providing the hub application 108 and the local device applications 136 on the mobile device 102 with access to the hub data 110 and the hub metadata 128. For example, the hub operating system service 134 may directly access the stored hub metadata 126 at the cloud storage and service 116.

The hub operating system service 134 (or alternatively, the hub application 108) may also determine and maintain a local copy of the membership associations of member users account identifiers 120 and identifiers of the private interaction hubs. The hub operating system service 134 may also synchronize the stored hub data 124 from the cloud storage and service 116 with the hub data 110 at the mobile device 102, and synchronize the stored hub metadata 126 from the cloud storage and service with the hub metadata 128 at the mobile device. The hub operating system service 134 may also synchronize with the cloud storage and service 116 (e.g., by sending changes or additions to hub data 110 and hub metadata 128 to the cloud storage and service 116). Such data synchronizations may occur in response to a user launching the hub application.

The mobile device 102 includes the device applications 136 that permit a user of the mobile device to access, create, and/or modify the hub data 110, private data 138 of the user, as well as the stored hub data 124 that is managed by any of the data and messaging services 122 at the cloud storage and service 116. Some or all of the device applications 136 may be implemented as client-side components or modules of any of the data and messaging services 122, or may be implemented as standalone, native applications (e.g., local device applications) at the mobile device. The device applications 136 typically each consume and provide access to only a portion or subset of the hub data 110 and the private data 138, such as only a single type of hub data and private data (e.g., only messaging data, but not calendar data). The device applications also typically present the consumed hub data to a user in conjunction with the private data 138. Private data is data or metadata that is not associated with a private interaction hub and that has not been shared with other members of the hub (e.g., data that has not been shared via the cloud storage and service 116).

The device applications 136 at the mobile device 102 may include a native or third-party messaging application that provides a user with messaging alerts and access to messaging threads. The messaging application provides access to both shared message threads shared with a private interaction hub and private message threads between a user of the mobile device and others who are not members of the hub. The messaging application also allows a user to send a message to all of the hub members without accessing a hub user interface of the hub application. The messaging application may not provide user access to other types of the hub data 110, other than the hub messages. For example, the messaging application may not provide access to the shared calendar events or shared photo albums of the hub.

The device applications 136 may also include a native or third-party calendaring application that provides scheduling alerts and access to a visual calendar. The calendaring application provides user access to both shared calendar events that are shared with hub members, and private calendar events (e.g., Exchange calendar events) that have not been shared with other members of the hub. The calendaring application also allows a user to create and/or share a calendar event to all members of the hub without accessing a hub user interface of the hub application. The application may not provide user access to other types of the hub data 110, other than the hub calendar events. For example, the calendaring application may not provide access to the shared message threads or shared photo albums of the hub.

The device applications 136 may also include a native or third-party media viewing and/or editing application that provides access to photo albums of digital photos or other digital media. The media application provides user access to both shared media files (e.g., photos, videos, and/or music) shared with a private interaction hub, and private media files that have not been shared with other members of the hub. The media application also allows a user to share media files with all members of the hub without accessing a hub user interface of the hub application. The media application may not provide user access to other types of hub data 110, other than hub media files. For example, the media application may not provide access to the shared message threads or shared calendar events of the hub.

The hub operating system service 134 can expose one or more Application Programming Interfaces ("APIs"), application binary interfaces, and/or other types of interfaces 140 to the hub application 108 and to the device applications 136 on the mobile device 102 to allow these applications to access, generate, and/or modify the hub data 110 and/or the hub metadata 128, as described herein. The hub operating system service 134 can be implemented as an integrated software component or module of the operating system 132. The hub operating system service can be maintained at the mobile device 102 as executable instructions that are stored on computer-readable storage media, such as any suitable memory device or electronic data storage as described with reference to the example device shown in FIG. 4. Additionally, the hub operating system service can be executed with a processing system at the mobile device to implement aspects of private interaction hubs.

In embodiments, the hub operating system service 134 can initiate the hub management service 114 to provision a private interaction hub 118. A user of the mobile device 102 can start a private interaction hub 118 and also invite others to join an existing private interaction hub. For example, the hub user interface 106 of the hub application 108 may provide an existing hub member with the option to add a new member to the hub, and the user may identify the prospective member by providing either a mobile device number, or by selecting an existing contact from one of their social networks or other contacts.

The hub operating system service 134 can receive the request from an existing member user of the device and, in response, the hub operating system service 134 and/or the hub management service 114 communicates an invitation to join the hub as an SMS, MMS, or instant message sent to the prospective member's mobile device that may include a link to a registration site or other registration instructions. The hub operating system service 134 and/or the hub management service 114 receives (e.g., via a registration website) an acceptance to the invitation to join the private interaction hub that includes at least an account identifier (such as an SSO credential), and associates the new member with the existing hub at the hub management service 114. Updated membership information, including the new member's account identifier 120 may also be propagated to other mobile devices of other members in the private interaction hub from the hub management service 114. When the new member user joins the hub, he or she may be prompted to download and/or install various applications configured to provide access to the stored hub data 124 and the stored hub metadata 126, such as the hub application 108 and/or the any of the device applications 136. The hub application 108 may also be the entry point by which a user creates a new hub and/or modifies the membership of an existing hub.

A private interaction hub 118 can be provisioned for any association of people, such as family members, coworkers, friends, neighbors, and any other people that may be associated together in a hub. Additionally, a member user of one private interaction hub may also be a member of multiple hubs, which can be based on a single member sign-on that identifies the member to the hub operating system service 134 and/or to the hub management service 114. For example, a person may be a member of a family hub that associates members of the person's family, as well as a member of a neighborhood hub that associates members of the person's neighborhood, and a golf hub that associates the person's friends that often golf together.

The integration of the hub application 108 with the operating system 132 of the mobile device provides that a user of the device can view a message or update on the hub user interface 106 and in an application user interface of an application that is associated with the message or the update. For example, a hub calendar is integrated with the calendar application (e.g., a device application 136) on the mobile device 102, and a calendar update that is displayed in the hub user interface 106 can be selected by the user to initiate the update being displayed in a calendar user interface of the calendar application. Alternatively, the user may view the calendar user interface and select a calendar event that is associated with a private interaction hub to initiate a display of the hub calendar, which includes the calendar event for the members of the hub. As another example, a hub calendar event can be displayed in a hub user interface, and the device calendar application can access and display the hub calendar event along with any private data calendar events that only the user of the device has access to view in a user interface of the device calendar application. The hub application 108 and the device application 136 both acquire the same hub calendar event data (e.g., the same hub data 110 stored on the mobile device). The two different user interfaces (e.g., a hub user interface and a device application user interface) display the same calendar event data.

In another example, the hub messages and chat features are integrated with messaging applications (e.g., the device applications 136) on the mobile device 102, and an email, text, or instant message that is displayed in the hub user interface 106 can be selected by the user of the mobile device 102 to initiate the message being displayed in a messaging application user interface. Alternatively, the user may view a recent message from a member of a private interaction hub in a messaging application user interface, and select the message to initiate a display of the hub messages interface, such as to view the discussion thread associated with the recent message.

In embodiments, the hub operating system service 134 at the mobile device 102 can receive social network updates for the member users of a private interaction hub 118, such as when two or more of the members of a hub are also "friends" on a public social network site, such as (e.g., FACEBOOK®, TWITTER®, or LINKEDIN®). The social network updates can be pulled from a social network site based on the established association of the account identifiers 120 of the hub members of a private interaction hub 118 at the hub management service 114. The hub operating system service 134 can then aggregate the social network updates for a particular hub for display in the hub user interface 106 or on a homepage "live tile" associated with the hub. The hub operating system service 134 at the mobile device 102 can also be implemented to coordinate multi-user interactive updates to an event that is managed in a private interaction hub. For example, several members of a hub may participate in a multi-player interactive game, and each successive interactive update from a member of the hub is initiated by the member at a respective associated mobile device. In some examples, the hub application 108 performs some or all of the functionalities of the hub operating system service 134 described herein.

Example methods 200, 300, and 900 are described with reference to respective FIGS. 2, 3, and 9 in accordance with one or more embodiments of private interaction hubs. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 2:
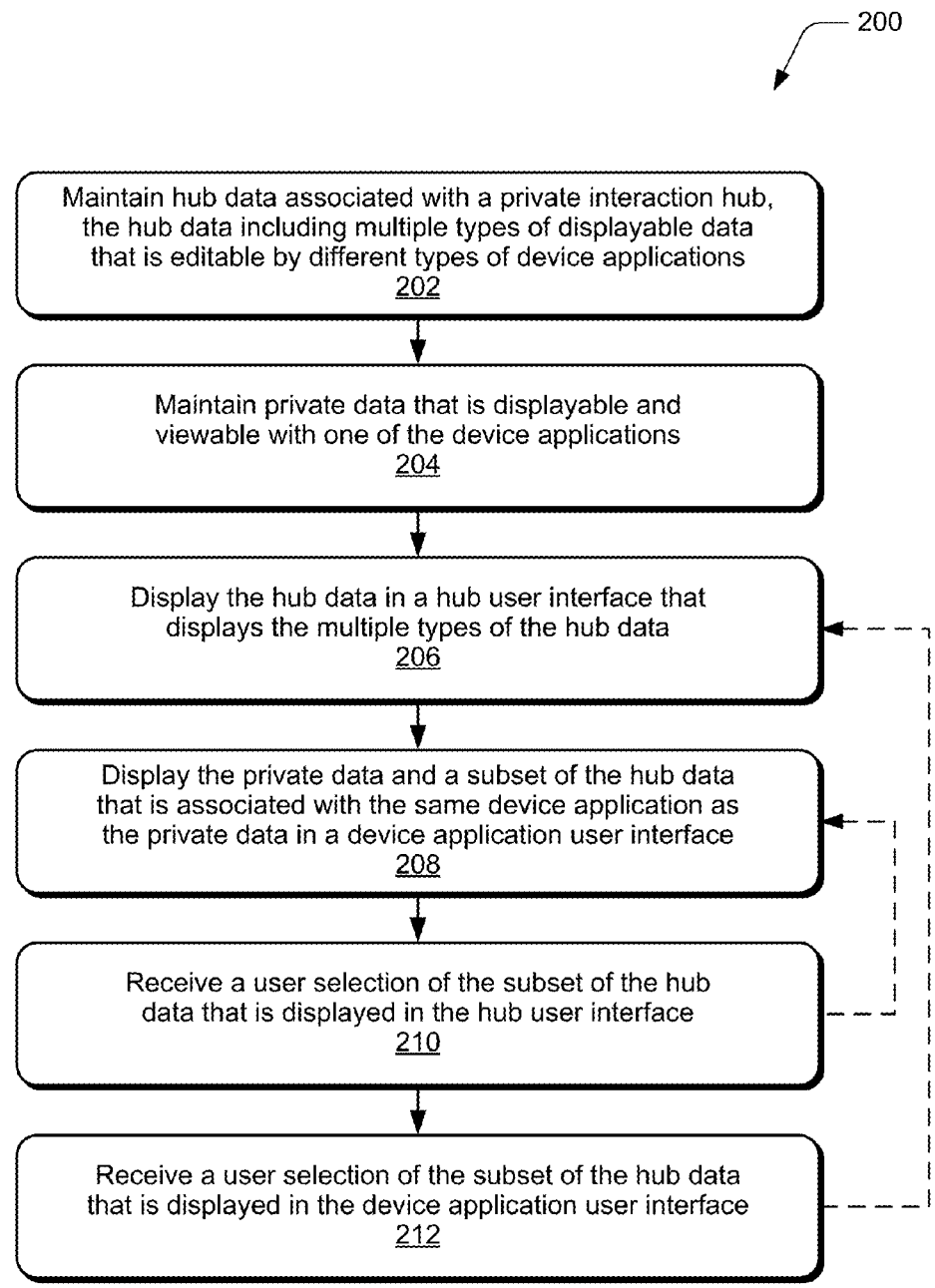
FIG. 2 illustrates example method(s) of private interaction hubs in accordance with one or more embodiments.

FIG. 2 illustrates example method(s) 200 of private interaction hubs. The order in which the method is described is not intended to be construed as a limitation, and any number or combination of the method operations can be combined in any order to implement a method, or an alternate method.

At 202, hub data that is associated with a private interaction hub is maintained, where the hub data includes multiple types of displayable data that is editable by different types of device applications. For example, during a hub synchronization operation, or as a result of a push operation by a messaging service or other service 122, the hub operating system service 134 of the mobile device 102 (FIG. 1) may obtain copies of the stored hub data 124 and/or the stored hub metadata 126 that are associated with a private interaction hub 118, and maintain these copies locally as the hub data 110 and the hub metadata 128. The hub operating system service 134 may also synchronize with the cloud storage and service 116 by sending data updates and changes, or additions to hub data 110 and hub metadata 128 at the mobile device 102, to the cloud storage and service 116. Such data synchronizations may occur in response to a user launching the hub application.

The different types of device applications 136 may include any type of software applications, and the functions and features thereof, that run (e.g., execute) on the mobile device 102, such as for user interaction with messaging, calendaring, gaming, media playback and viewing, document editing and viewing, Web browsing, communication applications, and any other type of user-interactive application. The device applications may also include system-level components that users of a device generally do not access or utilize, but that typically run in the background while the device is operational. Accordingly, the different types of hub data 110 includes multiple, different types of displayable data that is viewable and/or editable by the respective different types of device applications 136. Non-exhaustive types of editable and displayable data include SMS, MMS, or instant messaging data; calendar events and appointment data; any type of video and/or image data; and any type of documents that are generated and/or downloaded for editing and viewing.

At 204, private data of a user of the device is maintained, where the private data is displayable and viewable with one of the device applications. For example, the mobile device 102 maintains the private data 138 of a user in memory, and the private data is displayable and associated with one of the device applications 136 for viewing.

At 206, the hub data is displayed in a hub user interface of a hub application. The hub user interface displays the multiple types of the hub data, and typically does not display the private data of the user. For example, the mobile device 102 includes the display device 104 to display the hub data 110 in the hub user interface 106. The hub data that is displayed in the hub user interface may be viewable by each of the members of the private interaction hub 118 at a respective associated mobile device of each member.

At 208, the private data and a subset of the hub data that is associated with the same device application as the private data is displayed in a device application user interface. The device application user interface typically does not display the other types of maintained hub data that are not associated with the same device application. For example, the mobile device 102 includes the display device 104 to display the private data 138 and a subset of the hub data 110 that is associated with the same device application 136 as the private data in a device application user interface.

At 210, a user selection of the subset of the hub data that is displayed in the hub user interface is received and, (at 208), the subset of the hub data is displayed in the device application user interface in conjunction with the private data responsive to the user selection of the subset of the hub data. For example, the hub operating system service 134 at the mobile device 102 receives a user selection of the subset of the hub data 110 that is displayed in the hub user interface 106, and responsive to the user selection, the subset of the hub data can be displayed in the device application user interface in conjunction with the private data.

At 212, a user selection of the subset of the hub data that is displayed in the device application user interface is received and, (at 206), the subset of the hub data is displayed in the hub user interface with the multiple types of the hub data. For example, the hub operating system service 134 at the mobile device 102 receives a user selection of the subset of the hub data 110 that is displayed in the device application user interface, and responsive to the user selection, the subset of the hub data can be displayed in the hub user interface 106 with the multiple types of the hub data.

Figure 3:
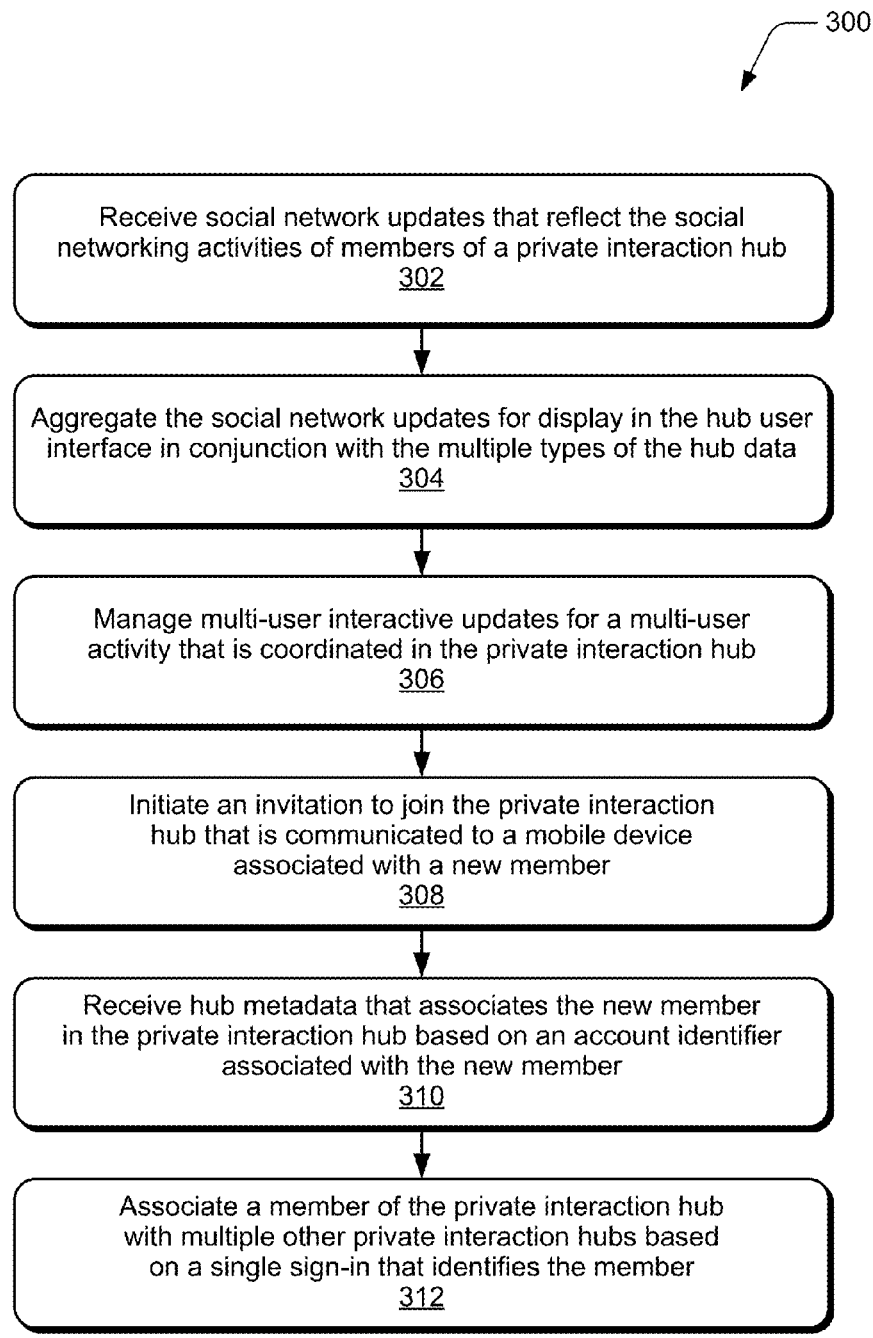
FIG. 3 illustrates example method(s) of private interaction hubs in accordance with one or more embodiments.

FIG. 3 illustrates example method(s) 300 of private interaction hubs. The order in which the method is described is not intended to be construed as a limitation, and any number or combination of the method operations can be combined in any order to implement a method, or an alternate method.

At 302, social network updates are received that reflect the social networking activities of members of a private interaction hub and, at 304, the social network updates are aggregated for display in the hub user interface in conjunction with the multiple types of the hub data. For example, the hub operating system service 134 at the mobile device 102 receives social network updates for the members of a private interaction hub 118, such as when two or more of the members are identified as "friends" on a social network site, and the hub operating system service aggregates the social network updates for display in the hub user interface 106 in conjunction with the multiple types of the hub data 110.

At 306, multi-user interactive updates are managed for a multi-user activity that is coordinated in the private interaction hub. For example, the hub operating system service 134 at the mobile device 102 manages multi-user interactive updates for a multi-user activity that is coordinated in a private interaction hub 118, such as when several members of the hub participate in a multi-player interactive game, and each successive interactive update from a member of the hub is initiated by the member at a respective associated mobile device.

At 308, an invitation (e.g., as an SMS or MMS message) to join the private interaction hub is initiated and communicated to a mobile device associated with a new member. For example, the hub operating system service 134 at the mobile device 102 initiates an invitation to join the private interaction hub 118, and the hub management service 114 communicates the invitation as an SMS or MMS message to a mobile device associated with the new member. An invitation may be communicated as an SMS, MMS, instant message, email, or other mode of digital communication, such as an NFC or other tap mechanism employed to communicate an invitation to join a private interaction hub. The hub management service 114 may then receive an acceptance reply to the invitation to join the private interaction hub, such as a single sign-on that identifies the new member to the hub operating system service 134 and/or to the hub management service 114.

At 310, hub metadata is received that associates the new member in the private interaction hub based on an account identifier associated with the new member. For example, the hub operating system service 134 at the mobile device 102 receives the hub metadata 128 that associates the new member in the private interaction hub 118 based on an account identifier 120 associated with the new member.

At 312, a member of the private interaction hub is associated with multiple other private interaction hubs based on a single sign-on that identifies the member. For example, the hub operating system service 134 and/or to the hub management service 114 receives a single member sign-on that identifies the member to the hub operating system service 134 or to the hub management service 114, and the member is associated in multiple private interaction hubs 118. A user of the mobile device 102 can then view the hub data for each of the private interaction hubs in a separate hub user interface 106 on the display device 104 of the mobile device.

Figure 4:
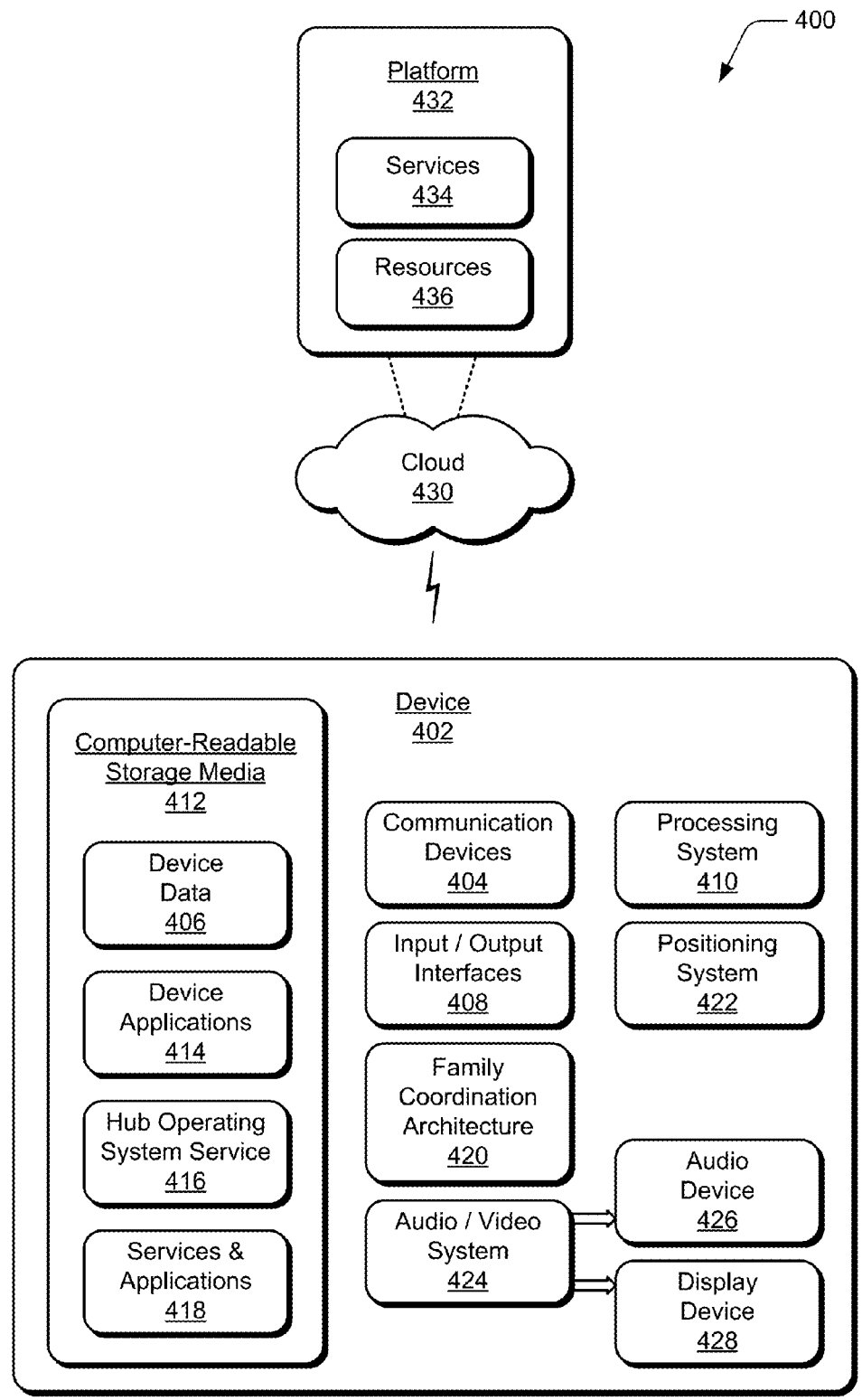
FIG. 4 illustrates an example system with an example device that can implement embodiments of private interaction hubs.

FIG. 4 illustrates an example system 400 that includes an example device 402, which can implement embodiments of private interaction hubs. The example device 402 can be implemented as any of the devices, services, and/or servers described with reference to the previous FIGS. 1-3 and subsequent FIGS. 5-9, such as any type of client or mobile device, mobile phone, tablet, computing, communication, entertainment, gaming, media playback, and/or other type of device. For example, the mobile device 102, hub management service 114, and/or cloud storage and service 116 shown in FIG. 1 may be implemented as the example device 402. Further, although aspects of private interaction hubs have been described in FIGS. 1-3 with reference to the mobile device 102, any of the described aspects and features of private interaction hubs can be implemented in a fixed computing device (e.g., a wired and/or desktop computer).

The device 402 includes communication devices 404 that enable wired and/or wireless communication of device data 406, such as media content and the shared hub data, such as messages, updates, and events data at the device. The media content can include any type of audio, video, and/or image data. The communication devices 404 can also include transceivers for cellular phone communication and/or for network data communication.

The device 402 also includes input/output (I/O) interfaces 408, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The I/O interfaces 408 also support natural user interface (NUI) inputs to the device 402, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 402 includes a processing system 410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 402 may further include any type of a system bus or other data and command transfer system that couples the various components within the device. A system bus can include any one or combination of different bus structures and architectures, as well as control and data lines.

The device 402 also includes computer-readable storage media 412, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 412 provides storage of the device data 406 and various device applications 414. The computer-readable storage media 412 also provides storage for an operating system of the device that is maintained with the computer-readable storage media and executed by the processing system 410. In this example, the device also includes a hub operating system service 416 that implements embodiments of private interaction hubs, such as when the example device 402 is implemented as the mobile device 102 shown in FIG. 1. An example of the hub operating system service 416 is the hub operating system service 134 that is integrated with the operating system 132 at the mobile device 102, as described with reference to FIG. 1.

The device applications 414 can also include any of the applications 418 that implement aspects of private interaction hubs and/or mobile devices family coordination, such as described with reference to the following FIGS. 5-9. The example device 402 also includes a family coordination architecture 420, which may be implemented in the general context of software, firmware, hardware (e.g., fixed logic circuitry), or any combination thereof to support embodiments of private interaction hubs and/or mobile devices family coordination. The device 402 can also include a positioning system 422, such as a GPS transceiver, or similar positioning system components, that can be utilized to determine a global or navigational position of the device.

The device 402 also includes an audio and/or video system 424 that generates audio data for an audio device 426 and/or generates display data for a display device 428. The audio device and/or the display device include any devices that process, display, and/or otherwise render audio, video, display, and/or image data. In implementations, the audio device and/or the display device are integrated components of the example device 402. Alternatively, the audio device and/or the display device are external, peripheral components to the example device.

In embodiments, at least part of the techniques described for private interaction hubs may be implemented in a distributed system, such as over a "cloud" 430 in a platform 432. The cloud 430 includes and/or is representative of the platform 432 for services 434 and/or resources 436. For example, the services 434 may include the hub management service 114, the cloud storage and service 116, and any of the data and messaging services 122 as described with reference to FIG. 1. Additionally, the resources 436 may include the stored hub data 124 and the stored hub metadata 126 as described with reference to FIG. 1.

The platform 432 abstracts underlying functionality of hardware, such as server devices (e.g., included in the services 434) and/or software resources (e.g., included as the resources 436), and connects the example device 402 with other devices, servers, etc. The resources 436 may also include applications and/or data that can be utilized while computer processing is executed on servers that are remote from the example device 402. Additionally, the services 434 and/or the resources 436 may facilitate subscriber network services, such as over the Internet, a cellular network, or Wi-Fi network. The platform 432 may also serve to abstract and scale resources to service a demand for the resources 436 that are implemented via the platform, such as in an interconnected device embodiment with functionality distributed throughout the system 400. For example, the functionality may be implemented in part at the example device 402 as well as via the platform 432 that abstracts the functionality of the cloud 430.

Figure 5:
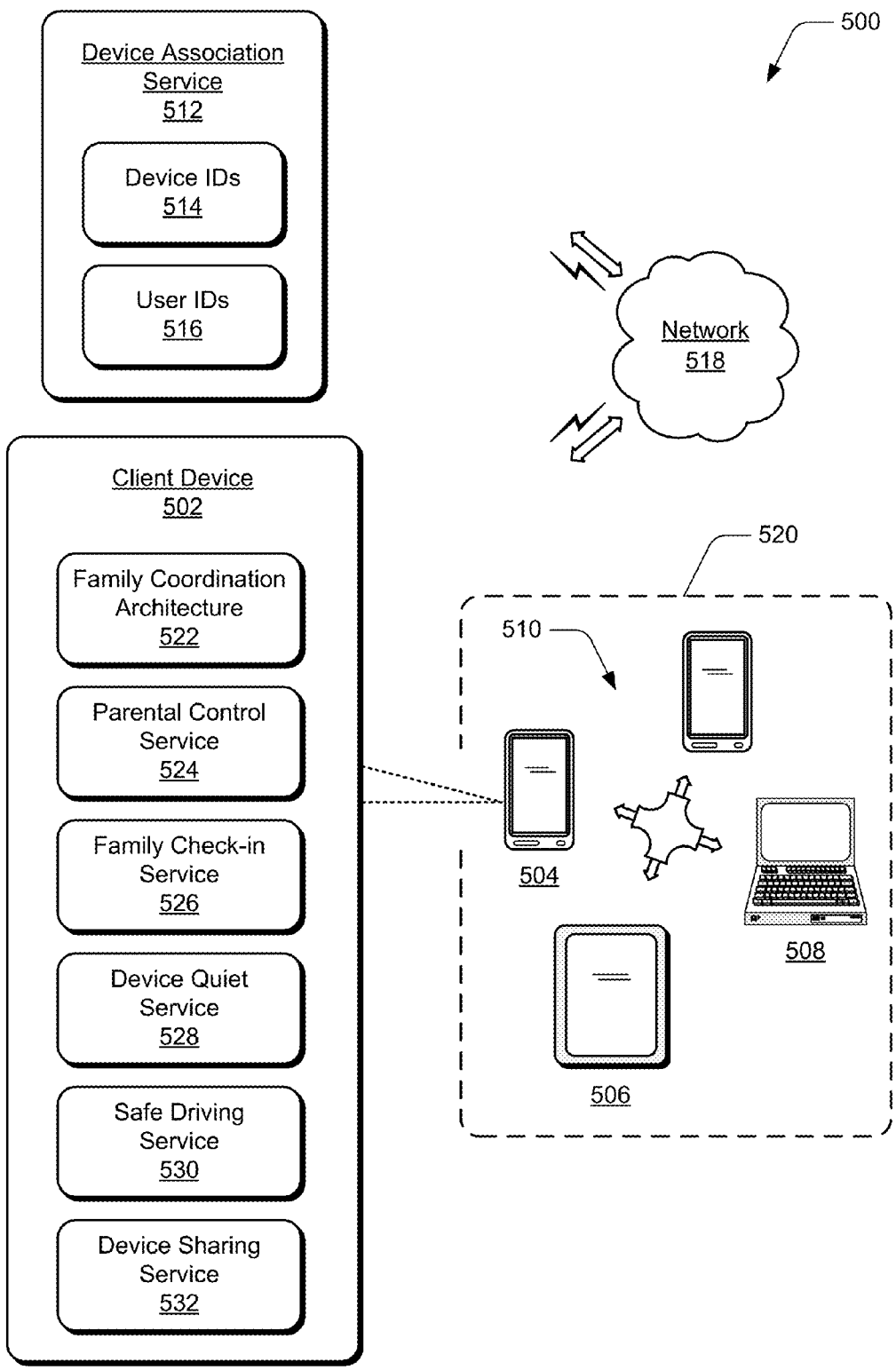
FIG. 5 illustrates an example system in which embodiments of private interaction hubs and/or family coordination can be implemented.

FIG. 5 illustrates an example system 500 in which various embodiments of private interaction hubs and/or family coordination can be implemented. Any of the aspects and features of private interaction hubs as described with reference to FIGS. 1-3 can be utilized to implement some or all of the features of family coordination described in the following FIGS. 5-9, to include family members that choose to be associated in a private interaction hub. The example system includes a client device 502, which may be any one or combination of a mobile phone 504, tablet device 506, computing device 508, communication, entertainment, gaming, navigation, and/or other type of portable electronic device. Any of the client devices 510 can be implemented with various components, such as a processor and/or memory system, as well as any number and combination of differing components as further described with reference to the example device shown in FIG. 4.

The example system 500 includes a device association service 512 that associates or correlates the client devices 510 by device identifiers 514, user identifiers 516, and/or by any other type of identifiable association. Any of the devices and services can communicate via a network 518, which can be implemented to include wired and/or wireless networks. The network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider. A mobile operator can facilitate mobile data and/or voice communication for any type of a wireless device or mobile phone.

The client devices 510 can each be associated with a different user, and the users are defined members of a family 520. The example client device 502 is representative of the various client devices 510 in the family. Any of the client devices in the family can include services, such as software applications (e.g., computer-executable instructions), that can be executed by a processor or processor system to implement the embodiments described herein. In this example, the client device 502 includes a family coordination architecture 522 that implements features of a family hub; a parental control service 524 that implements features of a parent dashboard; a family check-in service 526; a device quiet service 528 that implements features of quiet time and quiet zone; a safe driving service 530; and a device sharing service 532. The client device services are further described with reference to FIG. 6.

Additionally, any one or combination of the various client device services may be abstracted for implementation by a network service provider, such as the device association service 512. For example, the client devices 510 that are associated in the family 520 can be interconnected through a central computing device or system (e.g., may be one of the client devices 510), which may be local to the multiple devices or may be located remotely from the devices. In embodiments, the central computing device may be a cloud service of one or more server computers that are connected to the multiple devices via the communication network 518 or other communication link. The interconnection architecture enables functionality across multiple devices to provide a common and seamless experience to a user of the multiple devices. Each of the client devices may have different physical configurations and capabilities, and the central computing device implements a platform to enable delivery of an experience that is both tailored to a particular device and yet common to all of the devices.

Figure 6:
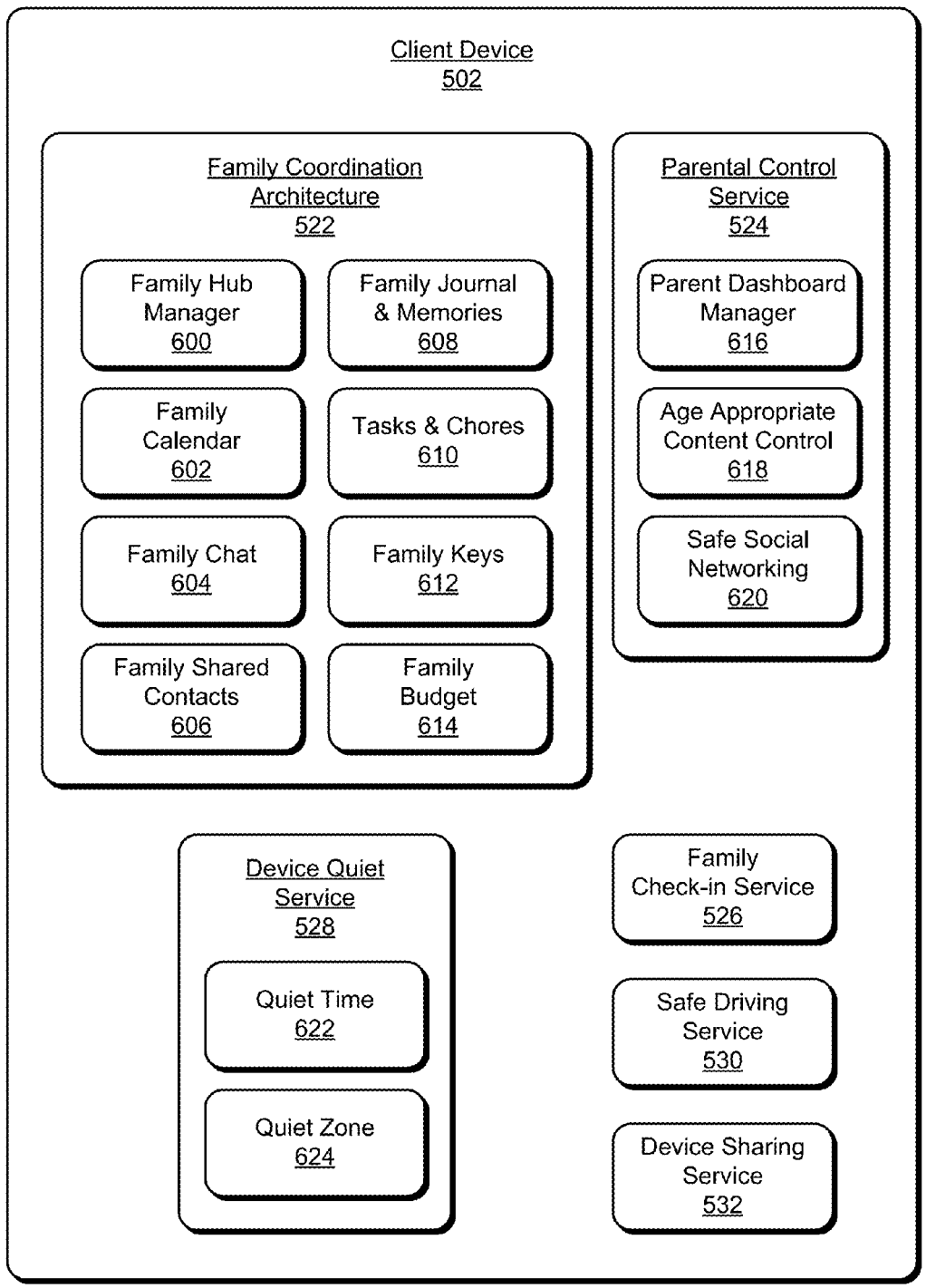
FIG. 6 illustrates various client device services and features in accordance with one or more embodiments.

FIG. 6 further illustrates the various client device services that are described with reference to FIG. 5. The client device 502 includes the family coordination architecture 522, the parental control service 524, the family check-in service 526, the device quiet service 528, the safe driving service 530, and the device sharing service 532. In embodiments, the family coordination architecture 522 may generally be implemented as a service, as described herein. Generally, any of the described services may be implemented and/or described in the general context of software, firmware, hardware (e.g., fixed logic circuitry), manual processing, applications, routines, programs, objects, components, data structures, procedures, modules, functions, or any combination thereof. A software implementation represents program code that performs specified tasks when executed by a computer processor. In embodiments, any of the processing, computation, filtering, code execution, etc. can be implemented with distributed computing services and/or devices, such as on a client device, a server device, and/or network-based service.

In this example of the client device services, the family coordination architecture 522 includes a family hub manager 600 that implements, coordinates, and/or manages various family features, such as family calendar 602, family chat 604, family shared contacts 606, family journal and memories 608, tasks and chores 610, family keys 612, and family budget 614. The parental control service 524 implements features such as a parent dashboard manager 616, age appropriate content control 618, and safe social networking 620. The device quiet service 528 implements features such as quiet time 622 and quiet zone 624. The various client device services and features are further described throughout the document.

Any of the client device services can include, be integrated with, or implement any of the other client device services and applications. For example, the family coordination architecture 522 can include any one or combination of the parental control service 524, the family check-in service 526, the device quiet service 528, the safe driving service 530, and the device sharing service 532. In embodiments, the family coordination architecture may be implemented for the coordination of time, messaging, data, activities, and any other shared services. The shared services may be any of the client device services and/or any type of shared services that may be associated with a service and/or multi-system operator (MSO) devices. Further, the parental control service can be implemented to throttle, expand, manage, and/or reallocate data sharing of the client device services.

Any of the family features and/or applications of the family coordination architecture can be implemented as private, some private and some public, or private with optional user control to share information and data with public third-party services and applications. Similarly, any of the client device services and applications described herein may be private, public, sharable, user-controllable, and/or any combination thereof. In embodiments, the family coordination architecture and/or the family hub manager can be implemented as an overall managing architecture, a collective embodiment of, and/or integration of any of the client device services and/or applications that may be implemented for expandability and instantiated together as the family coordination and/or the family hub architecture. Further, any of the client device services can include, be integrated with, or implement any of the other client device services and applications, and collectively may be embodied as a family hub and/or coordination architecture or service.

Family Hub

FIG. 2 is an example of a system 200 showing two different examples of hub user-interfaces for a family-orientated hub. The description, layout, orientation, features, and organization of the text, images, photos, graphics, links, data, information, and presentation features shown with reference to the hub user interfaces, as well as with reference to any other user interfaces described herein and/or shown in the figures, are merely examples that may be altered in any aspect for various embodiments and/or implementations of mobile device check-in.

The hub is a central space for membership-orientated coordination of communications, activities, information, and integration. Designated member relationships can be utilized to define how the data and information is managed, and can be implemented to leverage the social contract, such as between members of a defined familial group in the illustrated example. In one or more implementations, the hub is implemented as a user interface (e.g., via a client device application) for integration and aggregation of the membership-orientated communications, activities, and information. A hub can be implemented as a private, shared space between defined members. The hub contains links to other members' profiles, and based on restriction settings, allows aggregation for visibility of some of other members' data and information within the hub. The hub shares a group calendar which can be viewed and edited, a common text message window, a posting board, a shared photo album, a check-in feature, and any other type of shared information.

Devices and/or device accounts can be associated within a set of devices or device accounts (e.g., a family phone account, user accounts, a connected set of devices, and so on), and all or a subset of the devices or accounts can communicate with other devices or accounts. The members of a hub can be defined by any number of different classes of people, such as Junior, Teen, Mom, Dad, (or Parent), Grandparent, Nanny, Life-Coach, and so on for the illustrated example of a family. Further, the members of a family can be defined to distinguish a live-in Nanny from a Babysitter, for example.

Additionally, membership of the hub as well as use of the hub by the members can be controlled by a select collection of users, such as one or two mobile phones by the associated users of the client devices. For example, one of the members in the hub can be the designated control person, such as Mom who runs the household, employer, and so on.

From a single configuration of the members, the hub can be provisioned, setup, and propagated out, e.g., automatically. The features and configuration of a hub may default to an automatic, easy setup, but any rule, feature, or configuration aspect can be readily modified by a user. Provisioning a hub may be based on billing, e.g., a family or corporate billing plan. However, if a phone device is changed to a different carrier, for example, the phone device can still receive texts related to the hub. Alternatively or in addition, provisioning a hub can be based on email addresses, phone numbers, user account identifiers, or any other identifier.

A retail person selling a new phone package, for instance, can easily identify the members each to their new phone devices and initiate the hub being instantiated. From a consumer perspective, it just works and members can walk out of the store all set up. All of the data and information can be shared with a single selection, and thus the members do not have to share each item (e.g., a grocery list, photos, calendar, etc.) individually and separately.

The hub user interface may act as a shared space that is customizable and provides for user-generated and shared content. Some information can be shared, while other information is not. For example, Mom's complete Christmas list is not viewable by the other family members, but Dad and Kids can add to the list (and only view their contribution). Hub setup may be performed "a la carte," meaning only the features that members want displayed on the hub wall can be selected. For example, Mom wants to see the shopping list, whereas Dad does not shop and so wants to avoid having the list displayed on his device, yet he could still access the shopping list to add items when desired.

The hub user interface integrates functions, calendar functionality, event and/or data summaries (i.e., on the "wall"), as well as content that is shared between the members of the hub (e.g., lists, documents, etc.). For example, the hub user interface may include a "family check-in" or "check-in" option. The hub user interface may also include a chat section where location check-ins messaged are displayed along with other messages interchanged between the members of the hub. The hub "wall" is representative of an area via which members of the group may add to as desired, like a lunchroom bulletin board, family refrigerator, and so on. In implementations, the information can be aggregated in pillars or columns and shown on the hub wall as illustrated. The hub wall can also represent an interrelation between any of the information and data that appears on the wall and its placement in time. The hub settings provide that a user can control which functions are integrated and displayed within the hub, such as on the wall.

The hub information may also be context relevant to the members of the hub, and the calendar includes shared hub events. Calendar updates can be posted as notice events on the wall, and a user can look at the wall to see upcoming hub events, or the events that pertain to one or more other members of the hub. Messaging may also be performed that is private among the members of the hub. A member can instant text (or other communication) to all other members in the hub. Texting—such as for a work meeting—can divide each members' display on their respective devices into individual screens for each member.

The hub may also be extensible, and may link to a hard drive on a home computer, or sync to just one of the other devices, the manager, or cloud control (e.g., from a network-based service). The hub may also be extensible to third parties that add a note on the hub wall, such as implemented with application program interfaces (APIs) for functions to post data to the hub. A third-party application, however, would not have access to the context of the hub wall, such as to obtain or display hub data. The private information and hub data could be encrypted and only decrypted by the phone devices that are associated with the hub.

Thus, the hub supported by the hub coordination architecture 112 may be thought of as a central space coordination of communications, activities, information, and integration of members of the hub. Hubs may be defined to support a variety of different membership, such as for family members, coworkers, friends, acquaintances, fan clubs, and so forth. Therefore, although examples are discussed that relate to a family in the following discussion it should be readily apparent that membership in the hub may be defined in a variety of other ways without departing from the spirit and scope thereof. Accordingly, the hub coordination architecture may be used to support a variety of different functionality, and further aspects of private interaction hubs are also described further herein.

Family Calendar

A family calendar is visible on the family hub wall and shared by all of the family members to update other family members of family-orientated events and activities, as well as individual family member appointments. In embodiments, the family calendar is displayed as part of the family hub user interface, and the family calendar can be implemented as a client device application. Embodiments of a family calendar include any one or combination of implementation features, such as described herein.

The family calendar can include any type of icons or identifiers of past and future events, activities, appointments, etc. for any of the family members in the family group. Information noted on the family calendar can be context relevant to the members of the family group, and the calendar includes shared family events. Calendar updates can be posted as notice events on the family hub wall, where a family member can look at the wall to see upcoming family events, or the events that pertain to one or more other family members. Conflicts resolution can be implemented to resolve calendar scheduling conflicts among the family members. The calendar may be shared with others that are not specifically immediate family members, such as Grandma or the Nanny who picks up the kids from school. The family calendar can include action, event, and/or task reminders that are related (e.g., cross-linked) in time. A school calendar can be integrated with the family calendar, and may be imported information from the kid's school, such as for assignments, events, grades, school calendar events, etc.

Family Chat

A family chat feature provides a privatized chat interface for the family members of the family group within the family hub. The family members can chat individually with one another, or with all of the family members. In embodiments, the family chat feature can be implemented as part of the family hub user interface, with a client device application.

Family Shared Contacts

A family shared contacts feature provides a shared phone, address, and/or contact listing for all of the family members in a family group. In embodiments, the family shared contacts feature can be implemented as part of the family hub user interface, with a client device application. Generally, one family member is the point of contact for the plumber, carpet cleaner, dog walker, and other service people—but when that family member is not available, the other family members typically don't have access or know who to contact. Embodiments of the family shared contacts feature provide that all of the family members have access to the family contacts, particularly when the usual point of contact family member is not available.

Family Journal

A family journal feature provides that any family member can share any type of material, information, newspaper or magazine subscription, linked reference, television programs, videos, music, etc., and tag the material for the attention of the other family members within the family group to generate the family's own journal. In embodiments, the family journal can be implemented as part of the family hub user interface, with a client device application. Embodiments of the family journal feature include any one or combination of implementation features, such as described herein.

The family journal can be utilized for subscriptions, such as a family newspaper subscription, family content tagging, television programs, videos, magazine articles, music, etc. to create the family journal. A family journal includes the concept of a scrapbook or memories (e.g., past events and information), however, the family journal generally pertains to the present or future tense collation of material for the family members. Additionally, each family member may have his or her own respective journal that the other family members can access and view.

Family Photos and Video

A family memories feature provides photos, video, images, and the like in a shared private photo album for the family members of the family group. Access to a photo album of family memories can be granted to non-family members. In embodiments, the family memories feature can be implemented as part of the family hub user interface, with a client device application. Embodiments of the family memories feature provide that a family memories journal or photo album can be implemented for the designated family members, and/or for extended family members, non-family members, friends, and the like.

Tasks & Chores

A family tasks and chores feature provides that a family member can identify and define tasks and/or chores for other family members to complete. The family tasks and chores feature can be integrated with other family hub features, such as the family calendar, family check-in, and eWallet. For example, the completion of tasks and chores can correlate to kids' allowance, or may be used as a family incentive to reach a milestone that all of the family members will benefit from, such as a family vacation, movie night, etc. In embodiments, the family tasks and chores feature can be implemented as part of the family hub user interface, with a client device application.

Family Keys

A family keys feature provides that a mobile phone or other portable communication device can be implemented to interrelate with an automobile or building, and give a user the ability to grant or restrict access and/or use of the automobile or building to someone either within the family group, or outside of the family group. In embodiments, the family keys features can be implemented as a user interface with the family hub and/or as a client device application. The family keys feature can also be implemented for interaction with application and on-line content stores (e.g., Windows Store, iTunes, etc.). Embodiments of the family keys features include any one or combination of implementation features, such as described in the following paragraphs.

Family keys provides electronic house and/or vehicle keys, and can be implemented with near field communication (NFC) security or other proximity security in a phone device. In embodiments, the phone is the identity that is associated with the electronic key to a house, building, or vehicle. A parent can unlock a car for someone, or unlock the front door of the house for a child coming home from school, for maid access, or for a delivery person. Family keys can also be used to monitor when a child enters and exits the house. A parent can also easily "change the locks" with the electronic family keys, and the key codes can be updated on all of the family members' devices.

The family keys can be set as variable time locks, such as to limit access to a vehicle after a designated time in the evening. Alternatively, a family key may be implemented as a portable permission slip to allow a kid access to a vehicle, television, computer, etc. Family keys can be implemented as an intersection of the house and family. For example, the television may not display some channels or content when only the kids are home, but will allow the channels and/or content to display when a parent is home (presumably monitored by adult).

Family keys can also be implemented to provide a kid money on his or her phone with a spending limit and/or a time limit. A parent doesn't have to then transfer money or access cash to give to the kid. This may be incorporated with remote parental approval. Related to family keys, people care about the safety and security of their families. In eWallet scenarios, a phone user may have fewer authentication checks for accessing a wallet if the user's phone is connected to the home WiFi and GPS shows that the user is located at the home. The user's phone may also manage a child's allowance. In terms of NFC, if a home's front door is NFC-enabled, a user can grant access to the housecleaning service and get notified when they attempt access or even require a response from my phone to "buzz them in". This can also be used to limit access within the house once a service provider has entered.

Family Budget

A family budget feature provides that a family member in a family group can allocate electronic funds to any of the other family members, or to non-family members. The family budget feature can also link with third-party applications to purchase and distribute such things as tickets and gift cards to any of the other family members in the family group. The family budget may be implemented in conjunction with an eWallet application, and can be implemented for vacation shopping, pre-paid passes, gift cards, and to keep track of electronic receipts. In embodiments, the family budget feature can be implemented as part of the family hub user interface, with a client device application.

Figure 7:
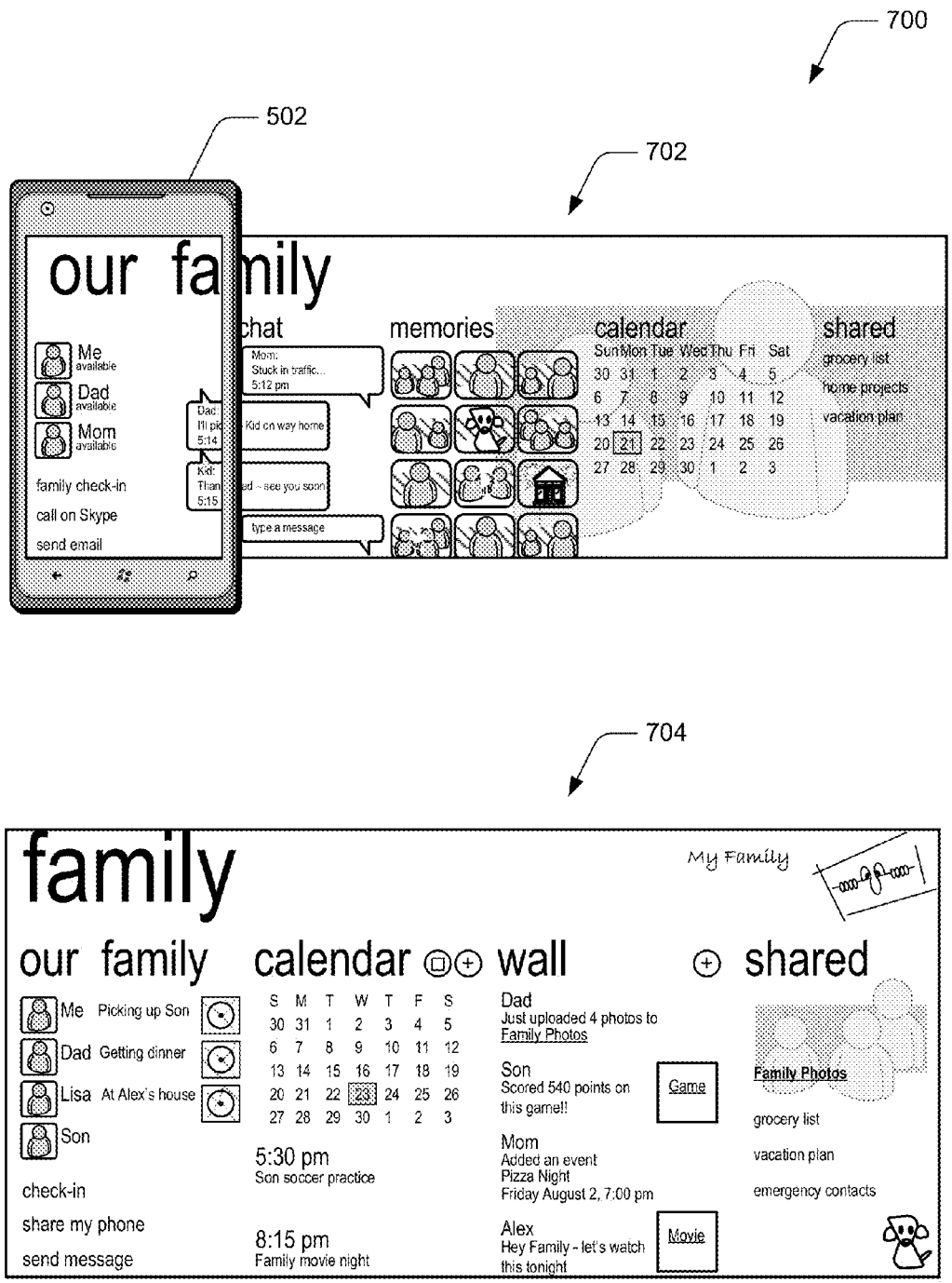
FIG. 7 illustrates examples of a family hub in accordance with one or more embodiments.
Figure 8:
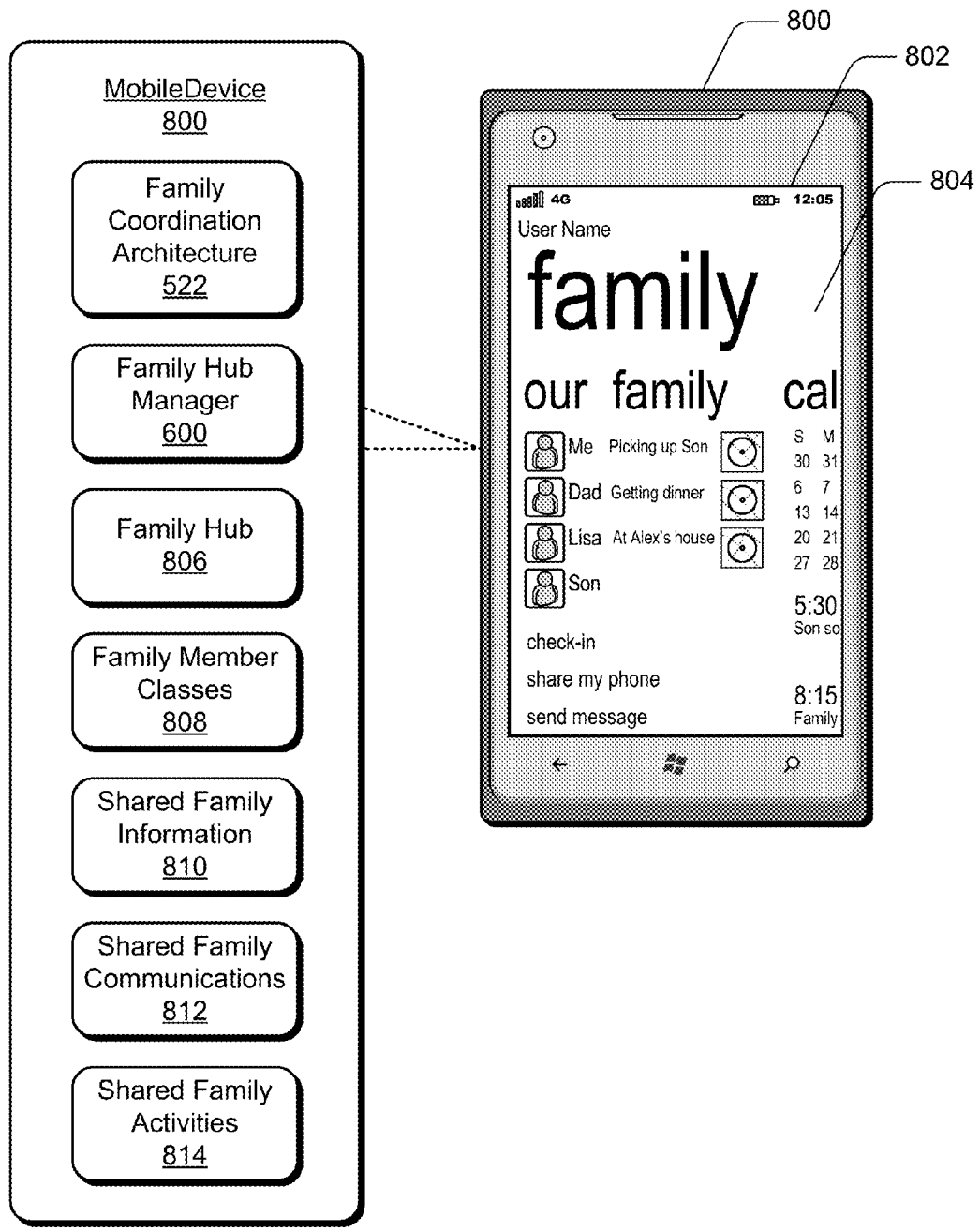
FIG. 8 illustrates an example mobile device in which embodiments of private interaction hubs and/or family coordination can be implemented.

FIG. 8 illustrates an example mobile device 800 in which embodiments of private interaction hubs and/or family coordination can be implemented. The mobile device 800 is an example of the mobile device 102 (FIG. 1), the client device 502, or any of the other devices 510 described with reference to FIGS. 1-7. The mobile device includes the family hub manager 600 of the family coordination architecture 522, and the mobile device can be implemented with various components, such as a processor and/or memory system, as well as any number and combination of differing components as further described with reference to the example device shown in FIG. 4. The mobile device 800 includes an integrated display device 802 on which a user interface 804 can be displayed, such as a portion of the family hub user interface 704 shown in this example.

The mobile device 800 includes the family hub manager 600 of the family coordination architecture 522, and is implemented to manage a family hub 806 that is a private, shared space of the family members. The family hub manager can provision the family hub based on designated family member classes 808 that define relationships between the family members, such as Parent, Grandparent, Teen, Child, and any other family member class. The family hub manager can then coordinate shared family information 810, shared family communications 812, and shared family activities 814 based on the designated family member classes associated with the family members in the family hub.

As described with reference to the family hub user interfaces 702 and 704 shown in FIG. 7, a family hub user interface can be implemented to display family information that includes a shared calendar, shared pictures, shared contacts, and a shared list. The shared calendar, shared pictures, shared contacts, and shared list are all editable by any of the family members from associated devices, and any of the family members may have more than one device from which the family hub features and information can be accessed. The family hub manager 600 can initiate posting calendar updates to the shared calendar as notice events that are displayed on the family hub user interface. The family hub user interface can also display the communications that include private group messages between the family members. The family hub manager also can be implemented to setup a wireless data connection when initiated by a family member via one of the associated devices, and then share settings for the wireless data connection with the associated devices on the family hub user interface.

Figure 9:
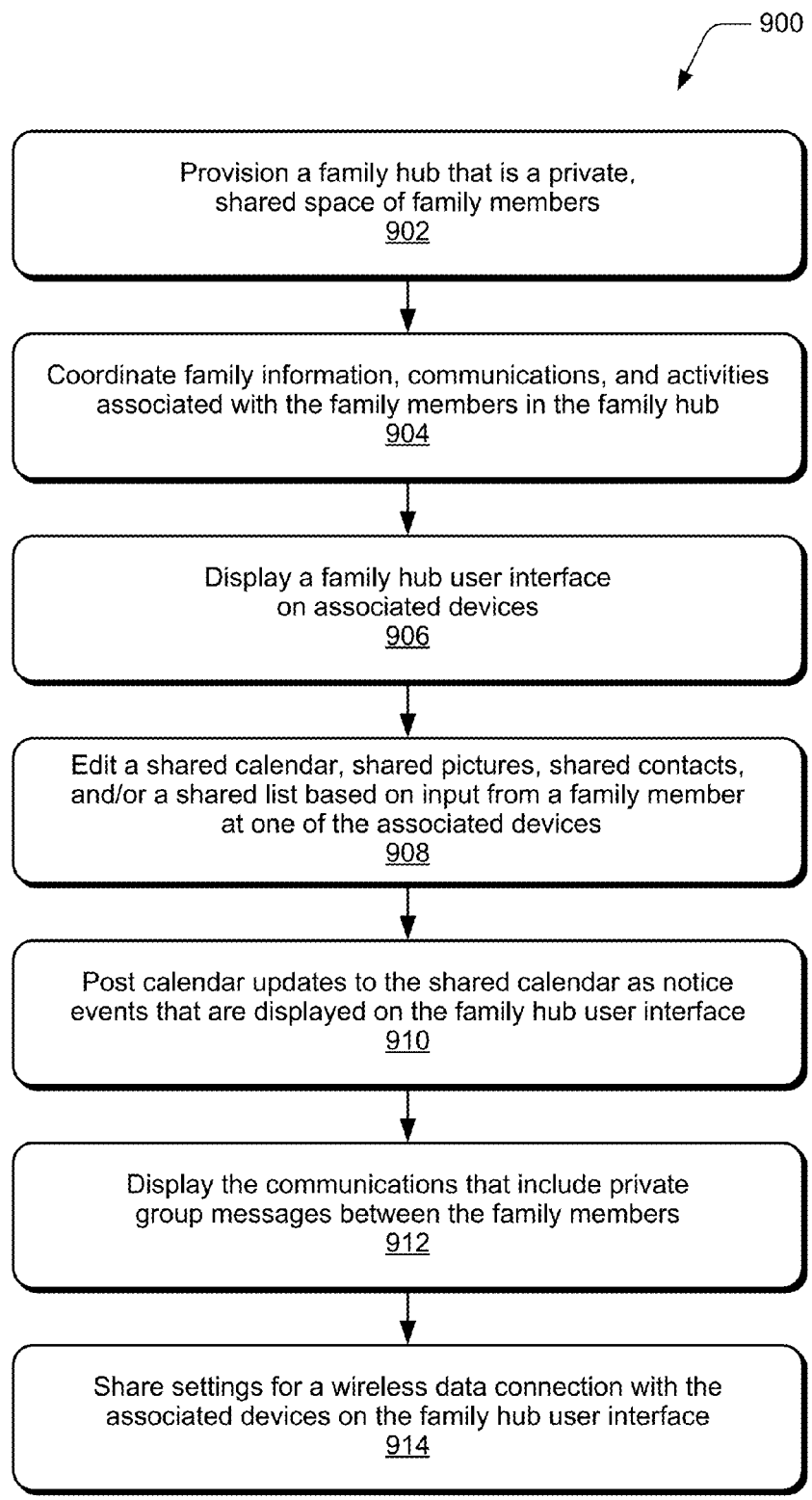
FIG. 9 illustrates example method(s) of private interaction hubs and/or family coordination in accordance with one or more embodiments.

FIG. 9 illustrates example method(s) 900 of private interaction hubs and/or family coordination. The order in which the method is described is not intended to be construed as a limitation, and any number or combination of the method operations can be combined in any order to implement a method, or an alternate method.

At 902, a family hub is provisioned as a private, shared space of family members. For example, the family hub manager 600 of the family coordination architecture 522 that is implemented at the mobile device 800 (FIG. 8) provisions the family hub 806 as the private, shared space of the family members, and the family hub is provisioned based on designated family member classes that define relationships between the family members. Similarly, the various client devices 510 (FIG. 5) can each implement a family hub manager of a family hub.

At 904, family information, communications, and activities associated with the family members in the family hub are coordinated. For example, the family hub manager 600 implemented at the mobile device 800 coordinates the shared family information 810, the shared family communications 812, and the shared family activities 814 based on the designated family member classes. Similarly, the family hub manager 600 at the client device 502 coordinates family information, communications, and activities associated with the family members in the family hub.

At 906, a family hub user interface is displayed on associated devices. For example, the mobile device 800 includes the integrated display device 802 on which a user interface 804 is displayed, such as a portion of the family hub user interface 704. The family hub user interface includes the displayed family information, communications, and activities associated with the family members that correspond to the associated devices, and the family information includes at least a shared calendar, shared pictures, shared contacts, and a shared list. Similarly, the various client devices 510 each include an integrated display device to display a family hub user interface.

At 908, a shared calendar, shared pictures, shared contacts, and/or a shared list is edited based on input from a family member at one of the associated devices. For example, the family hub manager 600 implemented at the mobile device 800 receives an input from a family member via an associated device to edit the shared calendar, shared pictures, shared contacts, and/or shared list that is displayed on the family hub user interface. Similarly, the family hub manager at the client device 502 edits and/or updates the family information that is displayed as part of a family hub user interface.

At 910, calendar updates to the shared calendar are posted as notice events that are displayed on the family hub user interface and, at 912, the communications are displayed that include private group messages between the family members. For example, the family hub manager 600 implemented at the mobile device 800 posts calendar updates as notice events that display on the family hub user interface 704, and the family hub manager initiates displaying private group messages between the family members on the family hub user interface 704. Similarly, the family hub manager at the client device 502 posts notice events for display and initiates displaying the private group messages between family members on a family hub user interface.

At 914, settings for a wireless data connection are shared with the associated devices on the family hub user interface. For example, the family hub manager 600 implemented at the mobile device 800 can setup a wireless data connection when initiated by a family member via one of the associated devices, and then shares the settings for the wireless data connection with the associated devices on the family hub user interface 704. Similarly, the family hub manager at the client device 502 can setup a wireless data connection and share the settings for the wireless data connection with the associated devices 510 on a family hub user interface.

Although embodiments of private interaction hubs have been described in language specific to features and/or methods, the appended claims are not necessarily limited to the specific features or methods described. Rather, the specific features and methods are disclosed as example implementations of private interaction hubs.

The invention claimed is:

1. A mobile device, comprising:
   memory storage configured to maintain hub data and private data at the mobile device,
   the hub data being associated with a hub, wherein the hub is a closed network where members of the hub privately interact with each other from a plurality of applications installed on their respective mobile devices, the hub data comprising displayable data that can be displayed in a hub user interface,
   the private data being associated with an individual member of the hub, wherein the private data is not to be shared within the hub; and
   a processor configured to:
      obtain additional hub data related to the hub;
      cause the display device to display at least a portion of the stored hub data and the obtained additional hub data in the hub user interface;
      determine a portion of the stored hub data and obtained additional hub data based on characteristics of an application; and
      cause the display device to display at least a portion of the private data and the determined portion of stored hub data and obtained additional hub data in a user interface of the application.

2. The mobile device as recited in claim 1, wherein the stored hub data and the obtained additional hub data that is displayed in the hub user interface is selectable to initiate the selected hub data in a device application user interface in conjunction with at least a corresponding portion of the private data.

3. The mobile device as recited in claim 1, wherein the stored hub data and the obtained additional hub data that is displayed in the user interface of the application is selectable to initiate the selected hub data in the hub user interface.

4. The mobile device as recited in claim 1, wherein the hub user interface is configured to display multiple types of the hub data without the private data.

5. The mobile device as recited in claim 1, wherein
   the hub data is viewable in the hub user interface that is displayable at each of the associated mobile devices of the members of the private interaction hub.

6. The mobile device as recited in claim 5, the processing system further configured to implement a hub operating system service that is configured to integrate the plurality of applications with an operating system of the mobile device to implement the hub; and wherein
   the hub operating system service is configured to:
      receive social network updates for one or more members of the hub; and
      aggregate the social network updates for display in the hub user interface.

7. The mobile device as recited in claim 1, the processing system further configured to implement a hub operating system service that is configured to integrate a third-party application with the hub, and wherein third-party application data is displayable in the hub user interface.

8. The mobile device as recited in claim 1, the processing system further configured to implement a hub operating system service that is configured to manage multi-user interactive updates for a multi-user activity that is coordinated in the hub.

9. The mobile device as recited in claim 1, the processing system further configured to implement a hub operating system service that is configured to:
   initiate an invitation to join the hub as an SMS message that is communicated by a hub management service to a new member mobile device;
   receive hub metadata that associates the new member in the private interaction hub based on an account identifier associated with the new member.

10. The mobile device as recited in claim 1, wherein a hub application and the application both acquire the same subset of the hub data that is maintained at the mobile device in the memory storage.

11. A mobile device, comprising:
   memory storage configured to maintain hub data that is associated with a hub, the hub data comprising multiple types of the hub data that is displayable in a hub user interface;
   a processing system to implement a hub operating system service that is configured to:
      integrate with an operating system of the mobile device to implement the hub that associates members for private interaction of the hub data;
      receive social network updates for one or more of the members of the private interaction hub; and
   a display device configured to display the social network updates in the hub user interface in conjunction with the multiple types of the hub data.

12. The mobile device as recited in claim 11, wherein the hub operating system service is configured to:
   initiate an invitation to join the hub as a message that is communicated by a hub management service to a new member mobile device;
   receive hub metadata that associates a new member in the hub based on an account identifier associated with the new member.

13. The mobile device as recited in claim 11, wherein a social network update that is displayable in the hub user interface is selectable to initiate the social network update being displayed in a social network user interface that is associated with the social network update.

14. A method, comprising:
   maintaining hub data and private data at a mobile device, the hub data associated with a hub, wherein the hub is a closed network where members of the hub privately interact with each other from a plurality of applications installed on their respective mobile devices, the hub data comprising displayable data that is editable by different types of device applications and that can be displayed in a hub user interface;
   the private data being associated with an individual member of the hub, wherein the private data is not to be shared within the hub;
   obtaining additional hub data related to the hub;
   displaying at least a portion of the stored hub data and the additional hub data in a hub user interface;
   determining a portion of the stored hub data and obtained additional hub data based on characteristics of an application; and
   displaying at least a portion of the private data and the determined portion of the stored hub data and obtained additional hub data that is associated with the application user interface of the application.

15. The method as recited in claim 14, further comprising:
   receiving a user selection of a subset of the hub data that is displayed in the hub user interface; and
   responsive to the user selection, displaying the subset of the hub data in the device application user interface in conjunction with the private data.

16. The method as recited in claim 14, further comprising:
   receiving a user selection of a subset of the hub data that is displayed in the device application user interface; and
   responsive to the user selection, displaying the subset of the hub data in the hub user interface with corresponding types of hub data.

17. The method as recited in claim 14, further comprising:
   receiving social network updates for one or more members of the hub; and
   aggregating the social network updates for display in the hub user interface in conjunction with the stored hub data and additional hub data.

18. The method as recited in claim 14, further comprising:
   managing multi-user interactive updates for a multi-user activity that is coordinated in the hub.

19. The method as recited in claim 14, further comprising:
   initiating an invitation to join the hub as an SMS message that is communicated to a mobile device associated with a new member; and
   receiving hub metadata that associates the new member in the hub based on an account identifier associated with the new member.

20. The method as recited in claim 14, further comprising:
   associating a member of the hub with multiple other hubs based on a single sign-on that identifies the member.

* * * * *